(12) United States Patent
Vu

(10) Patent No.: US 12,573,982 B2
(45) Date of Patent: Mar. 10, 2026

(54) PHOTONIC POWER CONVERSION AND INTER-FACILITY DISTRIBUTION

(71) Applicant: Foxbat Systems, LLC, Houston, TX (US)

(72) Inventor: Khoa Vu, Friendswood, TX (US)

(73) Assignee: FOXBAT SYSTEMS, LLC, Houston, TX (US)

( * ) Notice: Subject to any disclaimer, the term of this patent is extended or adjusted under 35 U.S.C. 154(b) by 0 days.

(21) Appl. No.: 18/997,166

(22) PCT Filed: Aug. 4, 2023

(86) PCT No.: PCT/US2023/071712
§ 371 (c)(1),
(2) Date: Jan. 20, 2025

(87) PCT Pub. No.: WO2024/031074
PCT Pub. Date: Feb. 8, 2024

(65) Prior Publication Data
US 2025/0260362 A1 Aug. 14, 2025

Related U.S. Application Data

(60) Provisional application No. 63/370,436, filed on Aug. 4, 2022.

(51) Int. Cl.
| | |
|---|---|
| *H02S 40/22* | (2014.01) |
| *F24S 23/70* | (2018.01) |
| *H02J 3/38* | (2006.01) |

(52) U.S. Cl.
CPC .............. *H02S 40/22* (2014.12); *F24S 23/70* (2018.05); *H02J 3/38* (2013.01); *H02J 2300/24* (2020.01)

(58) Field of Classification Search
CPC ... H02S 40/22; F24S 23/70; H02J 3/38; H02J 2300/24
See application file for complete search history.

(56) References Cited

U.S. PATENT DOCUMENTS

| | | | |
|---|---|---|---|
| 11,901,859 B1 * | 2/2024 | Otanicar | ............... H10F 77/492 |
| 2003/0140960 A1 | 7/2003 | Baum et al. | |

(Continued)

FOREIGN PATENT DOCUMENTS

| | | | | |
|---|---|---|---|---|
| CN | 117463258 A | * | 1/2024 | ............... C25B 1/04 |
| WO | WO-2020188587 A1 | * | 9/2020 | ............. H10F 77/63 |
| WO | 2024031074 A3 | | 2/2024 | |

OTHER PUBLICATIONS

International Search Report and Written Opinion of the International Searching Authority in related International Application No. PCT/US2023/071712, dated Jan. 3, 2024, 8 pages.

*Primary Examiner* — Leslie C Pascal
(74) *Attorney, Agent, or Firm* — Definitive Patents, member Synchrony IP; Timothy D. Snowden; Yau H. Chan

(57) ABSTRACT

Apparatus and associated methods relate to a photonic transmission system. In an illustrative example, a photonic transmission system may include a network of Photonic Energy Transmission and Communication System (PETACS). The PETACS, for example, may include a concentrator to receive solar energy to power various photonic loads. The concentrator may, for example, be configured to track an incoming light beam to a photovoltaic cell. For example, the PETACS may include a polarizing beam multiplexing system (PBMS). The PBMS may, for example, split a received light beam into multiple beams based on predetermined ranges of wavelengths. The PBMS may then power various photonic loads independently and simultaneously corresponding to a range of wavelengths. For (Continued)

example, the PETACS may transmit excess photonic energy and/or data to a remote PETACS using a steerable beam transceiver unit. Various embodiments may advantageously improve utilization of photonic energy and increase generation efficiency from solar energy.

20 Claims, 36 Drawing Sheets

(56)                     References Cited

U.S. PATENT DOCUMENTS

| | | | |
|---|---|---|---|
| 2007/0137690 A1* | 6/2007 | Bruning et al. ......... | H02N 6/00 |
| 2013/0342021 A1 | 12/2013 | Cyrus et al. | |
| 2014/0321057 A1 | 10/2014 | Cummings | |

* cited by examiner

1300

1305

1400

1415

1420A

1425

1430

1435

1405

1420B

1440

1600

1835

2000

2010

2005

2200

2200

2200

PHOTONIC POWER CONVERSION AND INTER-FACILITY DISTRIBUTION

CROSS-REFERENCE TO RELATED APPLICATIONS

This application is a national stage application under 35 U.S.C. 371 of and claims the benefit of PCT/US2023/71712, titled "Photonic Power Conversion and Inter-Facility Distribution," filed by Khoa Vu, on Aug. 4, 2023 which claims the benefit of U.S. Provisional Application Ser. No. 63/370, 436, titled "Photonic Power Conversion and Inter-Facility Distribution," filed by Khoa Vu, on Aug. 4, 2022.

This application incorporates the entire contents of the foregoing application(s) herein by reference.

TECHNICAL FIELD

Various embodiments relate generally to utilization and transmission of solar energy.

BACKGROUND

At present, there are various methods for generation of energy, distribution of energy, and transmission of information. In addition to power generation and transmission, the modern economy is continuously reliant on an increasing amount of data traffic. While data may be transmitted wirelessly, large amounts of data may also be transmitted through data wire, such as, by optical fiber or coaxial wire.

One example of an available methodology for the simultaneous transfer of both information and energy is electrical transmission. For example, many electrical transmissions are limited in both data transfer rate and power delivery capacity. In some examples, simultaneous transmission of data and power via electrical power system may require a substantial amount of infrastructure, such as long stretches of cable, protective insulation, and/or sheathing. These installations may be costly.

SUMMARY

Apparatus and associated methods relate to a photonic transmission system. In an illustrative example, a photonic transmission system may include a network of Photonic Energy Transmission and Communication System (PETACS). The PETACS, for example, may include a concentrator to receive solar energy to power various photonic loads. The concentrator may, for example, be configured to track an incoming light beam to a photovoltaic cell. For example, the PETACS may include a polarizing beam multiplexing system (PBMS). The PBMS may, for example, split a received light beam into multiple beams based on predetermined ranges of wavelengths. The PBMS may then power various photonic loads independently and simultaneously corresponding to a range of wavelengths. For example, the PETACS may transmit excess photonic energy and/or data to a remote PETACS using a steerable beam transceiver unit. Various embodiments may advantageously improve utilization of photonic energy and increase generation efficiency from solar energy.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

Various embodiments may provide a method for the transmission of both energy and information, using a network of modular devices. For example, the modular devices may collect light, either directly from the sun and, concentrating or collimating light into a beam, and/or from other devices on the network, converting concentrated or diverted light into various forms of useful energy, encoding information onto or decoding information off of the beam, or a combination thereof. Various embodiments may include one or more modular devices including appropriate optical, electrical, and mechanical components for generating and manipulating beams of light.

Various embodiments may include a method for the generation of energy and transmission of both energy and information, using an optical, electrical, and mechanical device which manipulates beams of light. Various embodiments may include the modular device so that various configurations to suit different environments, applications, and/or other installation requirements may be assembled.

Figure 1:
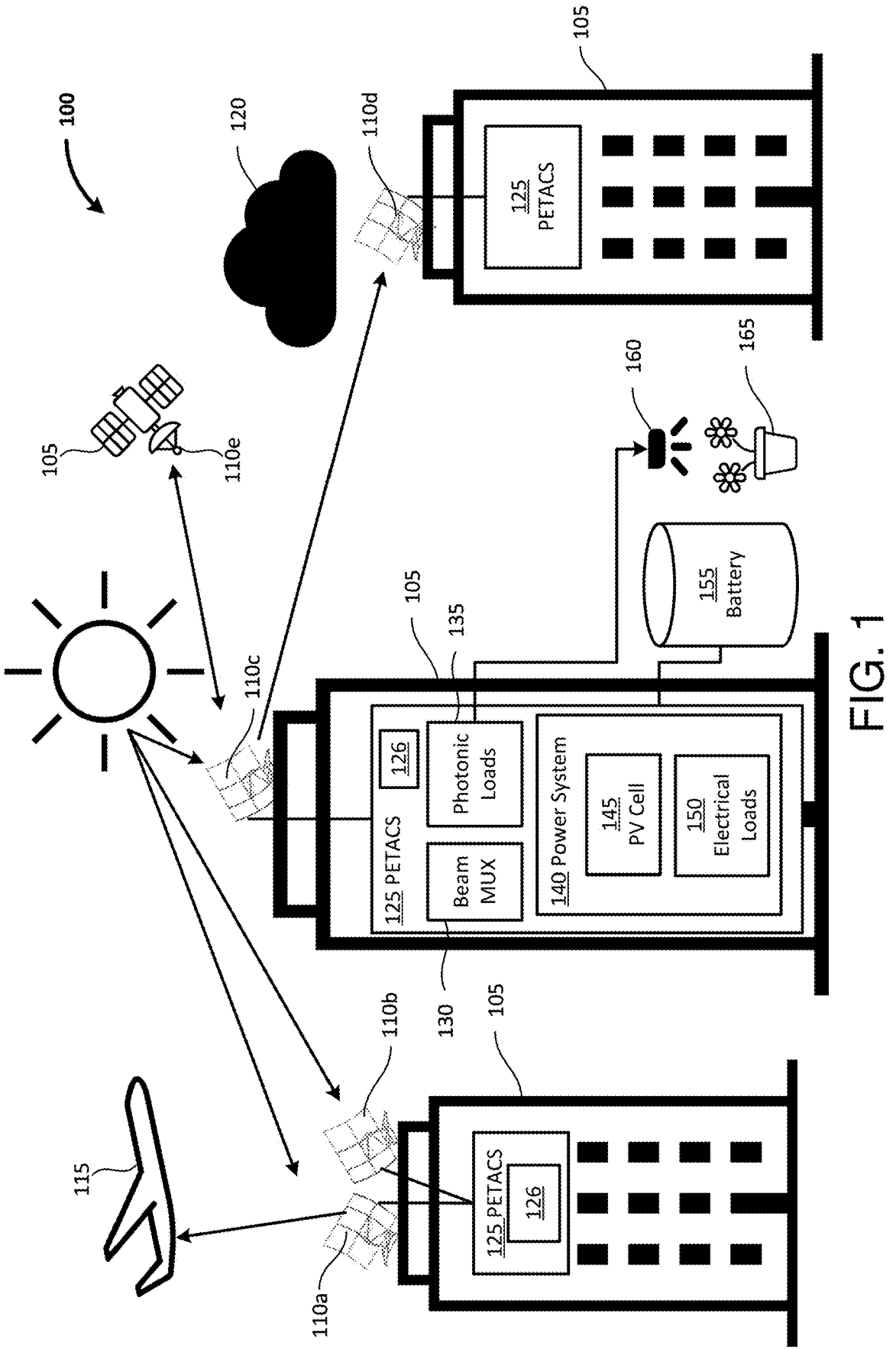
FIG. 1 depicts an exemplary Photonic Energy Transmission and Communication System (PETACS) employed in an illustrative use-case scenario.

Various embodiments of the modular devices may include modules for the collection, collimation, direction, modulation, demodulation, and conversion of photons into a variety of energy forms simultaneously, including electrical, chemical, thermal, and mechanical work, as well as modules for storing the desired energy forms onboard. The energy, for example, may be stored in various forms (e.g., thermal, electrical, chemical). Each module may perform a single, or multiple tasks, depending on the user's desired application FIG. 1 depicts an exemplary Photonic Energy Transmission and Communication System (PETACS) employed in an illustrative use-case scenario. In this example, a photonic energy network 100 includes facilities 105. For example, the facilities 105 may include ground facilities (e.g., buildings, houses, locomotives, vehicles, surface vessels). For example, the facilities 105 may include aerospace facilities (e.g., airplanes, unmanned aircraft, satellites, space stations, space hotels).

As shown, the facilities 105 include one or more concentrators 110*a-e* of solar energy. In some implementations, each of the facilities 105 may include one or more curved reflective concentrators 110*a-e*. For example, the curved reflective concentrators may be configured to collect or collimate photons. In some implementations, each of the concentrators 110*a-e* may be configured to direct, using passive or active elements or both (e.g., reflectors, prisms), photon beams towards a selected recipient. For example, the concentrator 110*a* may be adjustable to different angles by a servo motor (not shown). In this example, the concentrator 110*a* is directed to reflect at least part of a solar beam to an airplane 115. For example, the concentrator 110*d* may receive no solar energy due to a cloud 120 blocking the solar beam. The concentrator 110*c*, in this case, may be controlled to reflect at least part of the solar beam to the concentrator 110*d*.

In some examples, data and light beams may be transmitted between buildings 110*a-e*. For example, the concentrator 110*c* may also be operated to reflect the solar beam (e.g., by time multiplexing beam transmissions between the concentrator 110*c* and the concentrator 110*e*) to receive (and/or supply) energy and data from (and/or to) a satellite (as shown in FIG. 1).

As shown, each of the concentrators 110*a-e* is connected to a PETACS 125. The PETACS 125, in the depicted example, includes a beam multiplexer 130, a photonic load 135, and a power system 140. In some implementations, the beam multiplexer 130 may concentrate or split an incoming beam from the concentrator 110*b*. For example, the beam multiplexer 130 may be configured to direct a first predetermined wavelength range to a photovoltaic system as a concentrated beam(s). For example, the beam multiplexer 130 may direct at least a second predetermined wavelength range to the photonic load 135 (e.g., thermal load such as heat exchanger, kinetic engine).

The power system 140 includes a photovoltaic cell (e.g., the PV cell 145) and electrical loads 150. For example, the beam multiplexer 130 may include (polymer) reflectors to concentrate light beams from the sun onto the PV cell 145. For example, with a single junction, the PV cell 145 may have 20-40% efficiency. For example, the PV cells may be capable of producing multi-junction optimized for different band gaps—capable of 41-50%. The PV cell 145 may convert photonic energy from the beam multiplexer 130 into electrical power to the electrical loads 150 (e.g., electrical appliances).

In this example, the power system 140 is also connected to a battery 155. In some implementations, the electrical loads 150 may include various chemical and/or manufacturing processes. For example, the electrical loads 150 may include a Sabatier Reactor for carbon dioxide sequestration. For example, the Sabatier Reactor may use captured methane to form polyethylene plastics. In some examples, the electrical loads 150 may include pyrolysis processes for breaking down organic trash like grass clippings into syngas. For example, the battery 155 may store excess electrical power not utilized by the electrical loads 150. For example, the battery 155 may include various energy storage systems. For example, the battery 155 may include capacitors, fuel cells, batteries, or phase change thermal storage materials, such as wax or molten salts.

In some implementations, the PETACS 125 may include a controller module 126. For example, the controller module 126 may control the beam multiplexer 130 based on multiple predetermined frequencies. For example, a solar beam may be split into multiple beams based on the predetermined frequencies. In some implementations, the controller module 126 may direct the multiple beams to. for example, multiple loads (e.g., kinetic load such as Sterling/thermofluidic heat exchanger engine, thermal load) corresponding to predetermined frequencies.

In some implementations, the PETACS 125 may control a transmission of unused photonic power as a concentrated beam to one or more remote concentrators (e.g., the concentrators 110*a-e*). In various implementations, the PETACS 125 may advantageously utilize a broad spectrum of photonic energy to achieve high efficiency of harvesting solar power.

In some implementations, the PV cell 145 may advantageously increase a probability of a band gap junction to efficiently collect solar energy. In some examples, the PV cell 145 may become overheated upon receiving excessive solar energy. In some implementations, the controller may cool the PV cell 145 by diverting non-utilized photonic energy to the photonic loads 135 (e.g., use the non-utilized photonic energy for heating water) to advantageously reduce thermal stress without wasting the excessive energy. In this example, the photonic load 135 may be a light source 160 for a plant 165. In various examples, the PETACS 125 may advantageously provide a distributed multimodal photonic energy system to efficiently use photonic energy.

As to be discussed in further details in later figures, the beam multiplexer 130 may include light sensors, polarizers, dichroic mirrors, beam splitters, beam recombiners, and/or other optical instruments for monitoring and/or manipulating an incoming light beam. The photonic loads 135 may include low pressure turbines and/or thermal engines for mechanical work, heat exchangers for moving or storing thermal energy, photovoltaic cells, and/or Seebeck and/or Peltier electrothermal devices for electrical generation.

For example, the PETACS 125 may be fitted with wave guides, fiber optics, or filters to disperse the light beam for general lighting purposes, ultraviolet sterilization, passive infrared heating, or agricultural purposes. The PETACS 125 may further include various safety systems for protection of the individual modules, the device, and/or the photonic energy network 100, including, but not limited to heat exchangers, fans, cooling fins, valves, or shutters (e.g., in Mechanical form, Electro-Optical forms).

In various embodiments, a photonic energy network 100 may include multiple energy loads (e.g., the photonic load 135, the electrical loads 150) conduitlessly connected to the beam multiplexer 130 in a facility (e.g., any of the facilities 105). For example, the multiple energy loads may include a first energy load configured to consume a first form of energy. For example, the multiple energy loads may include a second energy load configured to consume a second form of energy.

In some implementations, a beam concentrator (e.g., the concentrator 110*a-e*) may include a tile array of reflector panels coupled to a plurality of actuators configured to track a position of a source of solar energy (e.g., the sun). For example, the beam concentrator may receive solar energy and transmit a concentrated light beam to the beam multiplexer 130. Various embodiments of the tile array of reflector panels are described with reference to FIGS. 3A-B.

For example, the beam multiplexer 130 may include a controller (e.g., the controller module 126), a dichroic optical element, and a pulse width modulated smart glass as described with reference to FIG. 6. For example, the dichroic optical element may divide the received concentrated light beam into at least two wavelength divided solar energy beams based on predetermined ranges of wavelength. For example, the at least two wavelength divided solar energy beams may simultaneously supply the first energy load and the second energy load to be subsequently converted into, respectively, the first energy form and the second energy form. In some implementations, the controller may use the pulse width modulated smart glass to encode information onto one or more of the at least two wavelength divided solar energy beams. For example, data and energy may advantageously be simultaneously relayed between facilities (e.g., the facilities 105) when the encoded solar energy beam is transmitted to a second facility.

Figure 2:
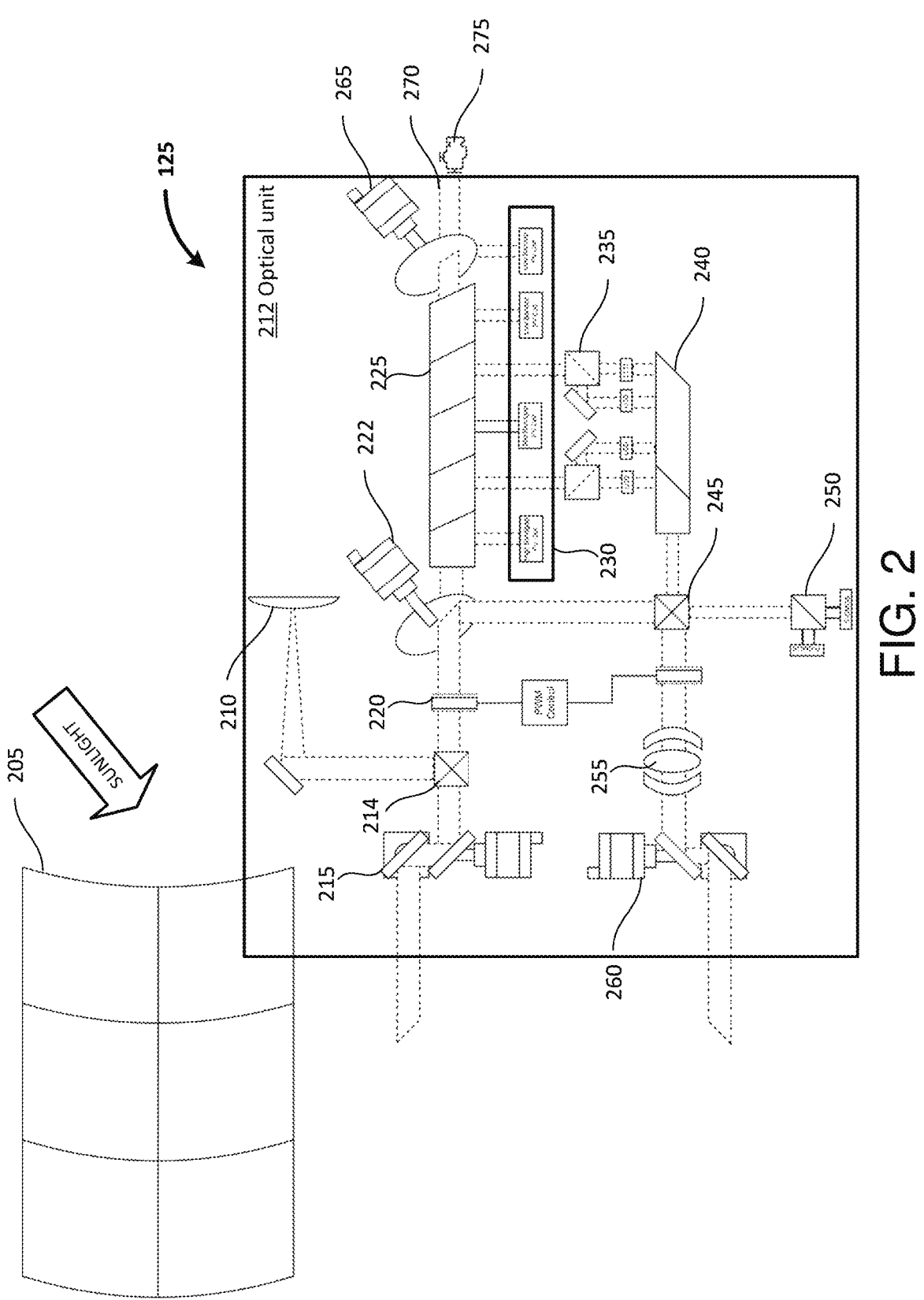
FIG. 2 is a block diagram depicting an exemplary PETACS.

FIG. 2 is a block diagram depicting an exemplary PETACS (e.g., the PETACS 125 of FIG. 1). As shown, sunlight is collected via a concentrating mirror 205 and focused onto a secondary mirror 210, then into an optical unit 212. For example, the concentrating mirror 205 may concentrate the sunlight into a raw beam.

Within the optical unit 212, the raw beam is combined via a beam combiner 214, with incoming data and power from other units on the network through the beam transceiver unit 215. In some implementations, multiple beam transceiver units may be used simultaneously. For example, multiple beam transceiver units may be used with multiple beam combiners. The unit passes through a pulse width modulated smart glass (e.g., an electrochromic reflector) (PVMSG 220) and/or a rotating variable intensity adjustment reflector (RVIAR 222). For example, the PVMSG 220 and the RVIAR 222 may be used in tandem as a protection mechanism to shut down the optical unit 212, and part of a data encoding process.

In some examples, the PVMSG 220 may control incoming and outgoing beams to not interfere with one another, transmit data to a beam transceiver unit 260, and/or to be decoded via a CMOS system, a charge coupled device (CCD) system, or simple photodiodes system with a polarizing beam splitter 250. The raw beam, now stripped of the incoming data, for example, may then be sent through a beam divider 225. For example, the raw beam may be encoded with additional data without stripping originally transmitted data. For example, the beam divider 225 may split the beam into multiple wavelengths. For example, some wavelengths may be used for generating power on either single, multi-junction, or a combination of PV cells 230. In some implementations, some portions of the raw beam may be diverted to an encoding unit 235.

In some examples, multiple systems may utilize one or more overlapping frequency bands of the raw beam. For example, some of the beam intensity may be selectively diverted, via a second RVIAR 265 to other power applications, in this example, via a vacuum sealed conducting tube 270 to a low temperature Stirling engine 275. In some examples, the power applications may include a thermoacoustic engine, a supercritical turbine, and/or thermo-electric devices such as Seebeck or Peltier devices. The second RVIAR 265 may provide kinetic energy to drive, for example, a pump and/or other actuators (e.g., a refrigeration or cooling equipment). The split beams may, for example, then be recombined, using a beam combinator 240, into a single data beam. In this example, the single data beam is combined with the power beam 245. The combined beam is then focused on a collimating lens assembly 255 before being transmitted out through the beam transceiver unit 260.

Figure 3A:
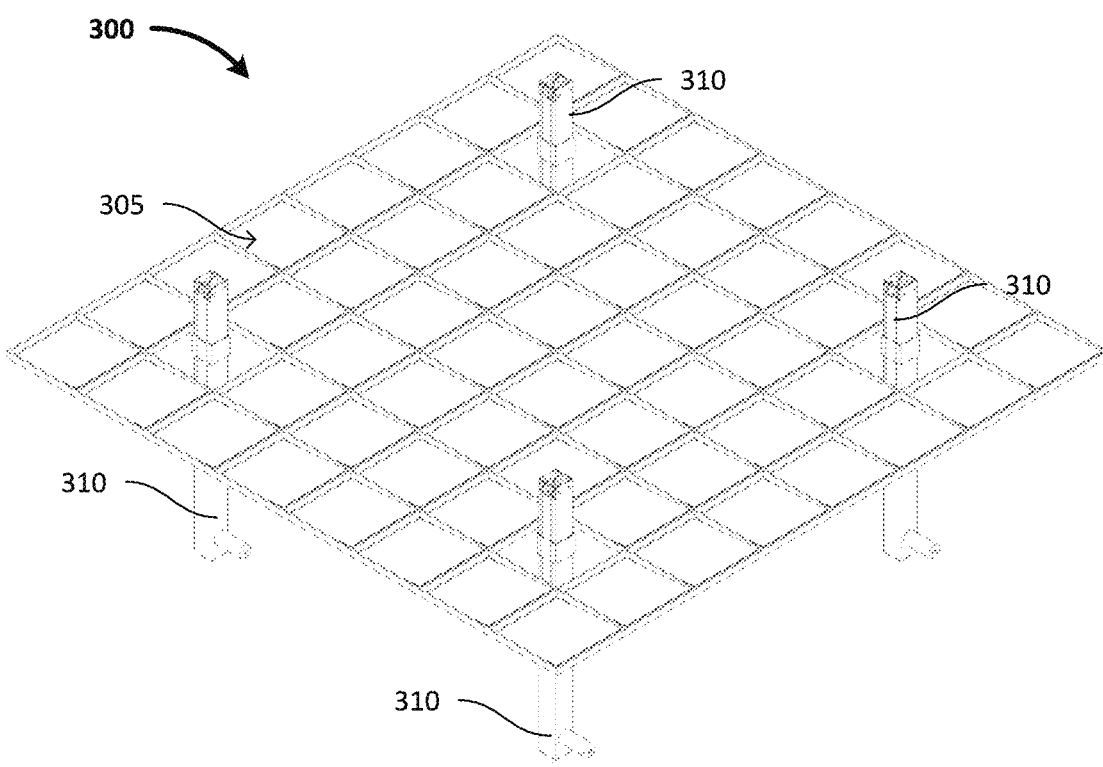
FIG. 3A and FIG. 3B depict an exemplary modular sunlight collector.
Figure 3B:
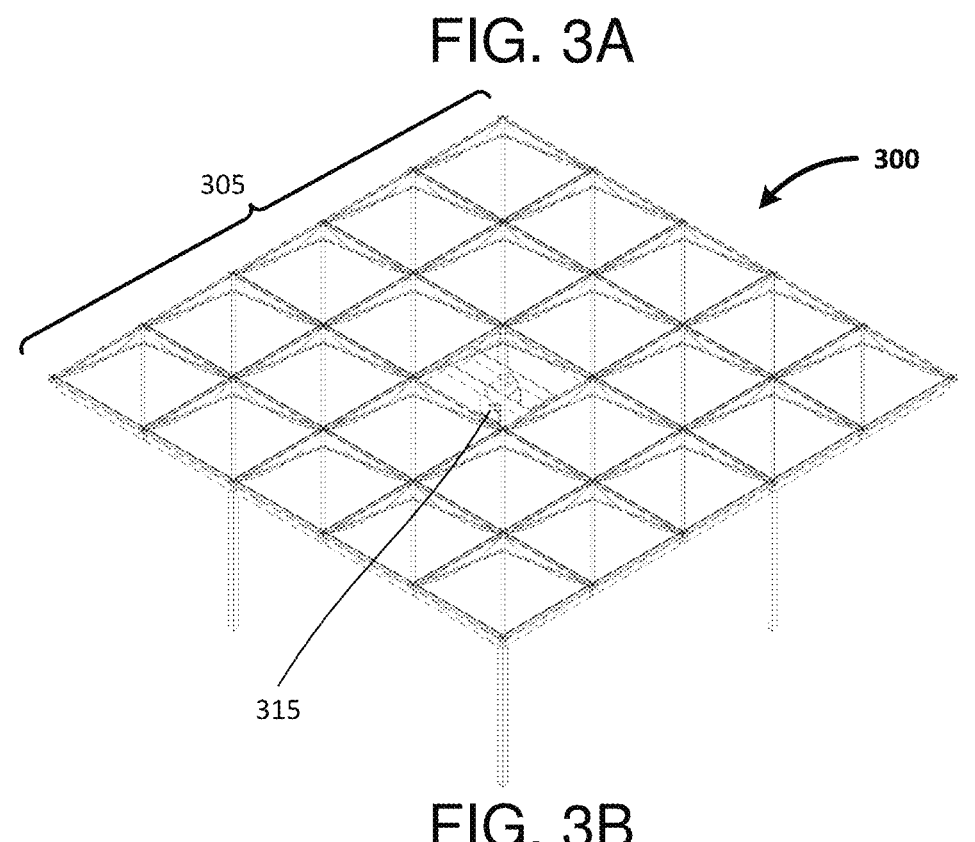

FIG. 3A and FIG. 3B depict an exemplary modular sunlight collector (MSC 300). For example, the MSC 300 may be used as a concentrator (e.g., the concentrators 110*a-e* described with reference to FIG. 1). The MSC 300, for example, may be installed as a free-standing structure to provide shade for parking lots. For example, the MSC 300 may be mounted onto a building. A frame of the MSC 300 may include waterjet aluminum beams. As shown in FIG. 3A, the MSC 300 includes modular reflector panels 305 (e.g., lightweight injection or vacuum molded polymer panels). In some implementations, the modular reflector panels 305 may be coated in a highly reflective polished coating. As shown in FIG. 3B, to improve manufacturability and maintain parts commonality, the frames may be expanded to accommodate 25 of the modular reflector panels 305. Depending on the installation, other number of frames (e.g., 9, 16, 48, 64) may also be possible. In some embodiments, using linear actuators (e.g., the control columns 310) on four columns. For example, the frames may include an extra central support column 315 to provide extra stability. Various embodiments of the structure shown in FIG. 3B may be used over a parking area to provide shade.

In some implementations, the MSC 300 may track the sun using the control columns 310. As shown in FIG. 3A, four of the control columns 310 (e.g., linear actuators Pulleys, hydraulics, motors) may be placed in the corners of the frame. For example, the control columns 310 may extend or retract to adjust an optical axis of the MSC 300. For example, the MSC 300 may be a concentrator array suspended by the control columns 310. For example, in conjunction with one another, the control columns 310 may pitch and roll of the entire array. Various embodiments may be suspended over an agricultural area for use as shade by livestock.

Figure 4A:
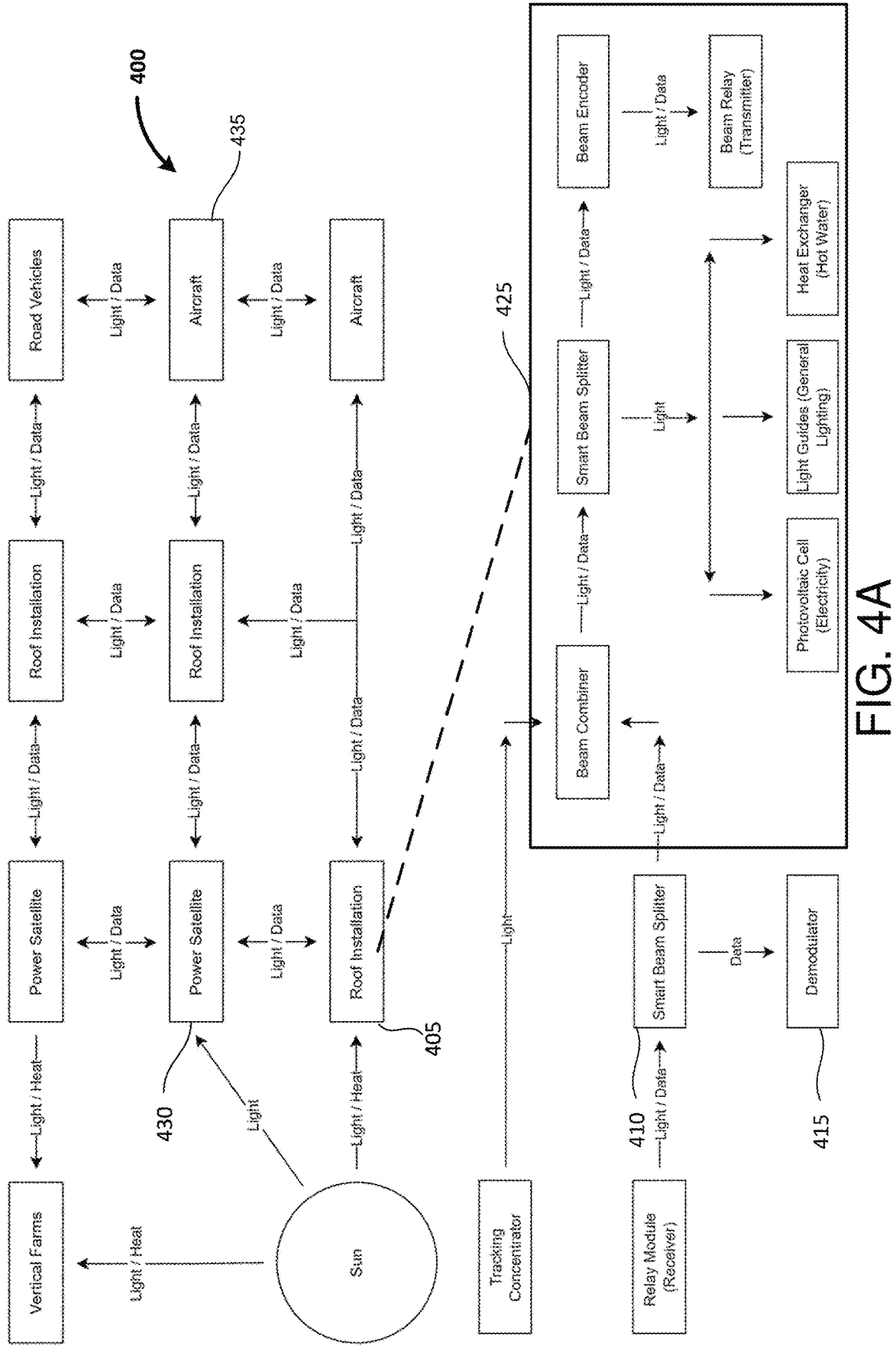
FIG. 4A is a block diagram showing some external and internal components of an exemplary photonic transmission network.
Figure 4B:
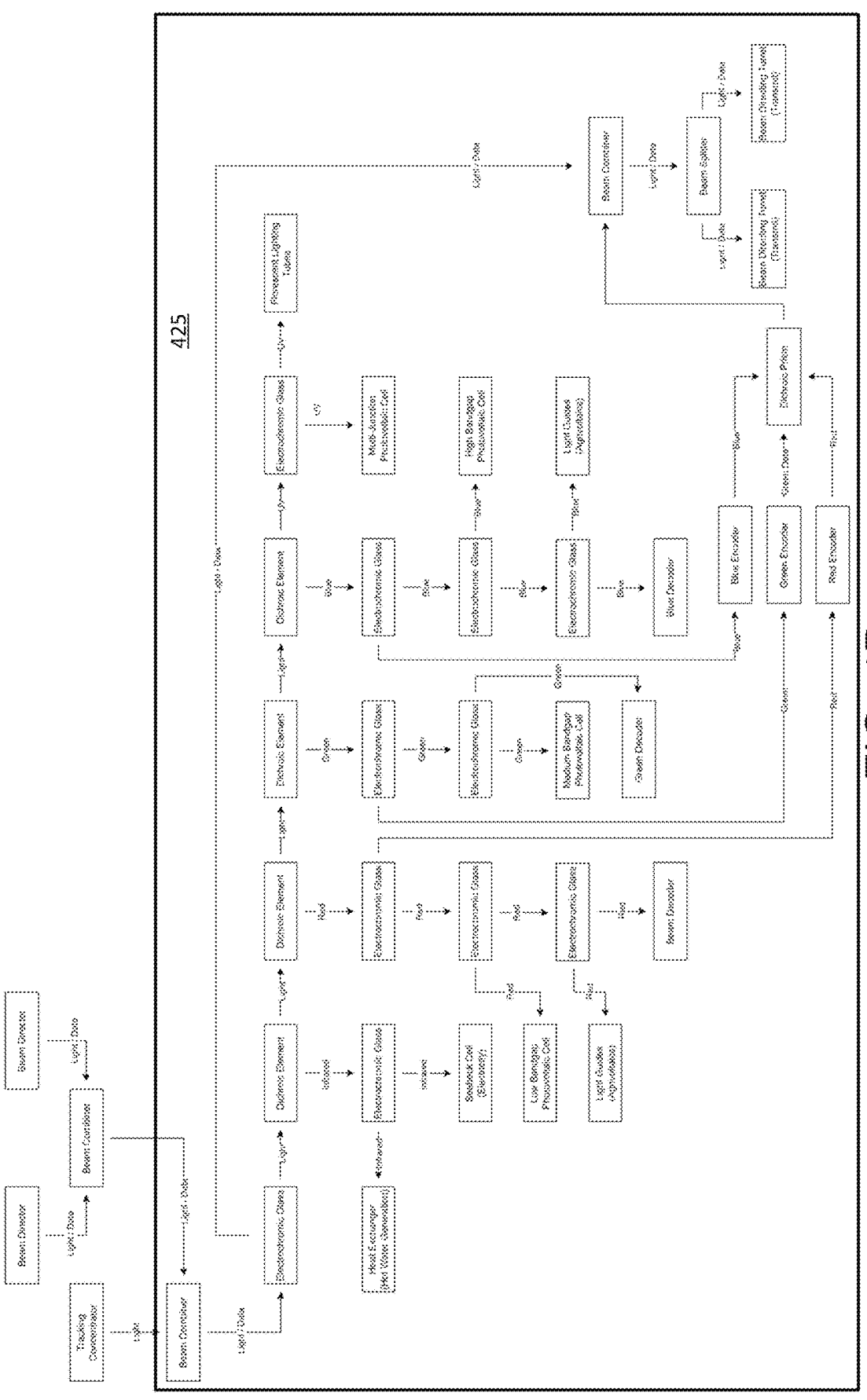
FIG. 4B is a block diagram depicting an internal system of an exemplary photonic transmission network.

FIG. 4A is a block diagram showing some external and internal components of an exemplary photonic transmission network, and FIG. 4B is a block diagram depicting an internal system of an exemplary photonic transmission network. As shown in 4A, data, light, electricity, heat, or a combination thereof may be transmitted between various entities. In this example, a roof installation 405 includes a smart beam splitter 410, a demodulator 415. For example, the roof installation 405 may supply energy and data communication to a consumer home 425.

For example, the roof installation 405 may receive light from the sun. For example, the roof installation 405 may receive light and data from a power satellite 430 and aircraft 435. For example, the power satellite 430 and the aircraft 435 may transmit light and data received from other power satellites and/or power stations to the roof installation 405. In various implementations, the photonic transmission network 400 may advantageously transmit a high power effectively and reduce transmission loss due to thermal energy generated within a transmission medium (e.g., fiber optic glass, a simple internally reflecting tube). In some examples, the photonic transmission network 400 may advantageously allow communication encoding of photonic beams in a dual power/communication transfer. Various embodiments may advantageously, for example, support a decentralized energy network.

In some implementations, by way of example and not limitation, multiple facilities may be coupled together. For example, multiple satellites 430 may be wirelessly coupled together in a power distribution and/or data distribution network. The network may, for example, be ad-hoc. In some implementations, facilities may, for example, include a peer-to-peer relationship(s) (e.g., power sharing, data sharing). The network may, for example, include master-slave relationships (e.g., master facility controlling power and/or data distribution of multiple slave facilities).

As an illustrative example, a central satellite (e.g., exploratory satellite, space station) may be communicably coupled to receive power and/or data from multiple remote facilities (e.g., power gathering satellites, ground-based facilities). The central satellite may distribute power to one or more remote auxiliary (e.g., slave) facilities and/or peer facilities. The central satellite may, for example, receive and/or transmit data from remote auxiliary facilities and/or peer facilities.

Figure 5:
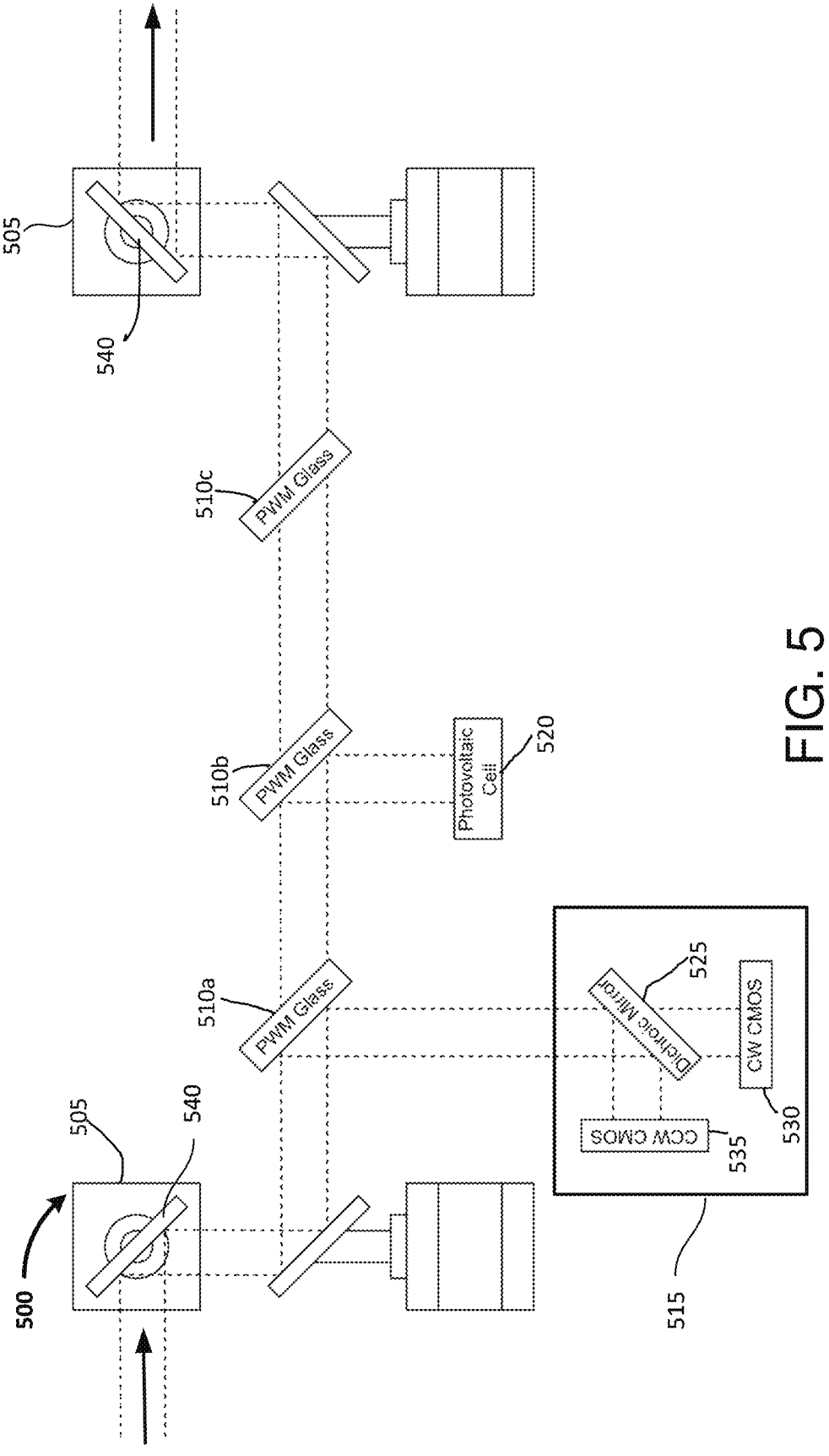
FIG. 5 depicts an exemplary schematic of an exemplary photonic communication circuit including a pair of exemplary beam directors, one used for receipt, and one for transmission.

FIG. 5 depicts an exemplary schematic of an exemplary photonic communication circuit including a pair of exemplary beam directors, one used for receipt, and one for transmission. For example, the beam directors may include a pair of steerable beam directors controlled via two servos. For example, one servo may be used for receipt. For example, another servo may be used for transmission. In this example, the PCC 500 receives a light beam from an outside source (e.g., another power station, power satellite, the sun) at an RVIAR 505. The PCC 500 includes, in this example, three PWM mirrors 510*a*, 510*b*, 510*c*. For example, the PWM Mirrors 510*a-c* may form a prism for the received light beam. The PWM Mirrors 510*a-c* may split, by reflecting light in a first predetermined frequency range, and passing through light in a second predetermined frequency range, the received light beam to different loads (an optical circuit 515, a solar cell 520).

The optical circuit 515 may be a light-based relay. For example, the optical circuit 515 may include a polarizer 525, a clockwise complementary metal-oxide semiconductor (CW CMOS 530), and a counter-clockwise CMOS (CCW CMOS 535). In some implementations, the CW CMOS 530 and the CCW CMOS 535 may include optical coatings. For example, the CW CMOS 530 and the CCW CMOS 535 may communicate via light, through the polarizer. Various examples may advantageously remove common traces for transistors to communicate with each other. In this example, the PCC 500 may transmit an output light to, for example, a next station via a RVIAR 540. For example, the PCC 500 may advantageously utilize unused and/or low efficiency frequencies for higher value uses in the next station.

In some implementations, a photovoltaic (PV) module may include a concentrator and a filter to target frequency range(s). For example, the PV module may reduce thermal stress and/or increase efficiency. In some implementations, the PV module may include safety monitoring/interruption of photonic beams to prevent injury. For example, the PV module may include a mechanical and/or opto-electrical shutter that, upon detecting an object approaching the output light, may automatically shut down transmission of the RVIAR 540 and the output light. In some examples, the RVIAR 540 may include a smart glass (e.g., an opto-electrical element) so that the RVIAR 540 transmission may be shut off when a safety concern is detected.

Figure 6:
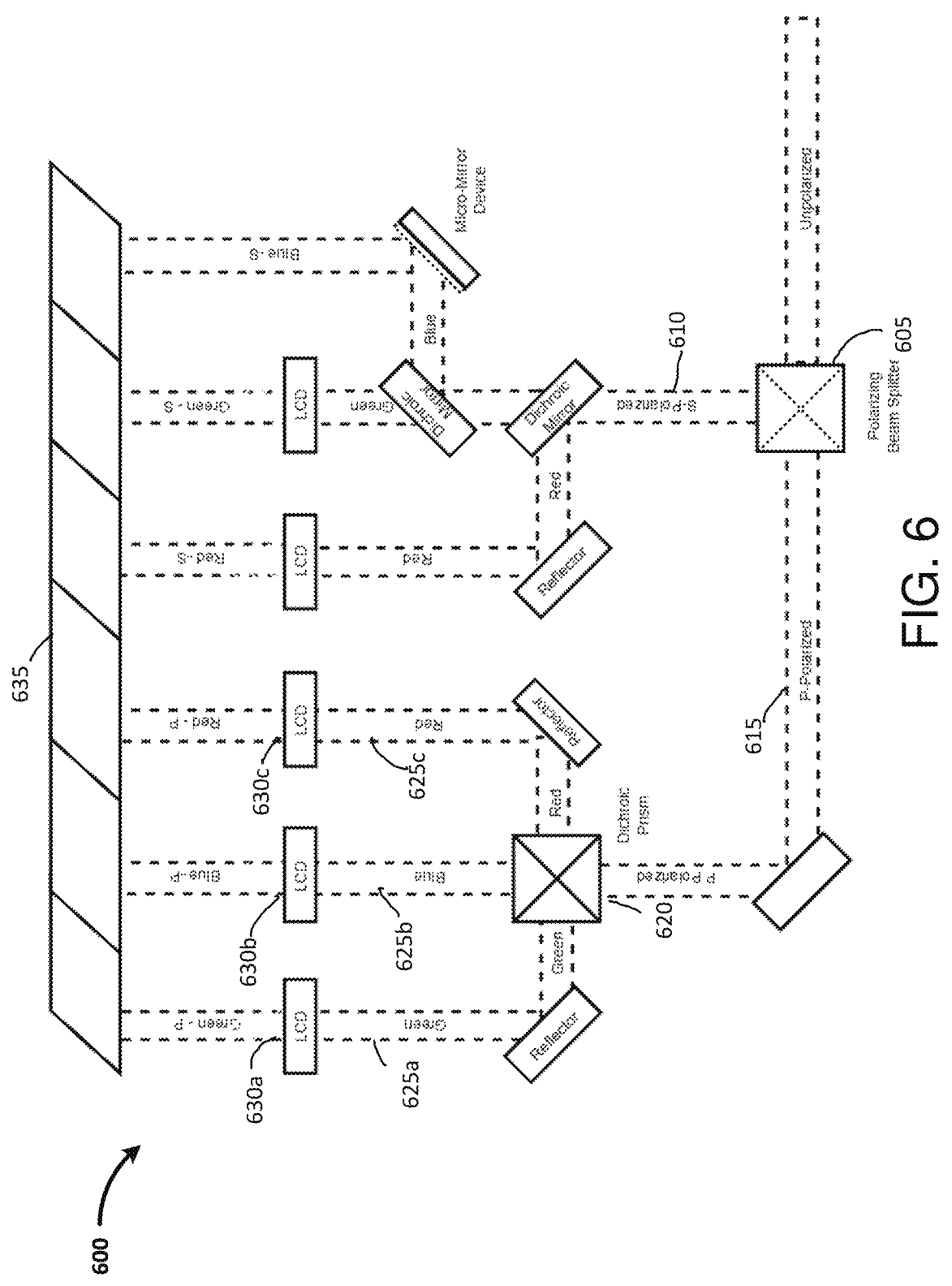
FIG. 6 is a block diagram depicting an exemplary polarizing beam multiplexing system.

FIG. 6 is a block diagram depicting an exemplary polarizing beam multiplexing system (PBMS 600). For example, the PBMS 600 may be used to encode information. In this example, an incoming beam from the right enters the system unpolarized and unencoded. A polarizing beam splitter 605 divides the incoming beam into an "S" beam 610 and a "P" Beam 615. For example, the division may advantageously enable doubled data transfer rates, as well as future proof functionality for quantum communication using split photons with entangled polarization. In some implementations, the polarizing beam splitter 605 may improve data security, and/or transmission efficiency (e.g., using superposition to store 4× more data in a single beam). In some examples, using the polarizing beam splitter 605, multiple data streams may simultaneously be transmitted. As an illustrative example, 3 beams may be simultaneously transmitted, including an up polarized stream, a side polarized (90 degrees offset) stream, and a reference stream (combined).

On the "P" Beam side, in this example the "P" beam 615 may be transmitted through a dichroic prism 620. The dichroic prism splits, in this example, the beam 615 into 3 different wavelength beams 625*a*, 625*b*, 625*c*. Each of the beams 625*a-c* may then be encoded via a transparent LCD 630*a*, 630*b*, 630*c*, in the depicted example. For example, the dichroic prism 620 may split a white light beam into respective frequencies for each LCD panel. For example, each of the beams 625*a-c* may be directed to a photonic load (e.g., a PV cell for energy generation, a UV end to sterilize water, an agriculture load for growing plants).

In some implementations, a pixel size of the LCDs 630*a-c* may be sized depending on a transmission distance and a desired bitrate of a corresponding application for the beams 625*a-c*. For example, a lower bitrate application may use a simple "single pixel" LCD. In some examples, the lower bitrate application may use a second PVM smart glass module.

The PBMS 600, in the depicted example, includes a beam combiner 635. In some implementations, some beams may be directed to other nearby PBMS. For example, the beam combiner 635 may generate an unpolarized beam from the un-utilized beam from all of the LCDs in the PBMS 600. In some examples, the PBMS 600 may use high-precision servo motors and gear down to send power and/or communication to line-of-sight downstream users.

In various implementations, an efficiency and lifespan of a PV cell may depend on operating temperatures of the PV cell. Depending on the operating environment, it may be advantageous to either adjust the photon concentration, or to provide thermal control to the photovoltaic cell, in order to optimize its output. In some examples, the PBMS 600 may include multiple types of energy to be collected via optical filters, to route photons of different frequency bands to either different photovoltaic cells optimized for different band gap levels, or to provide multiple forms of energy.

Figure 7A:
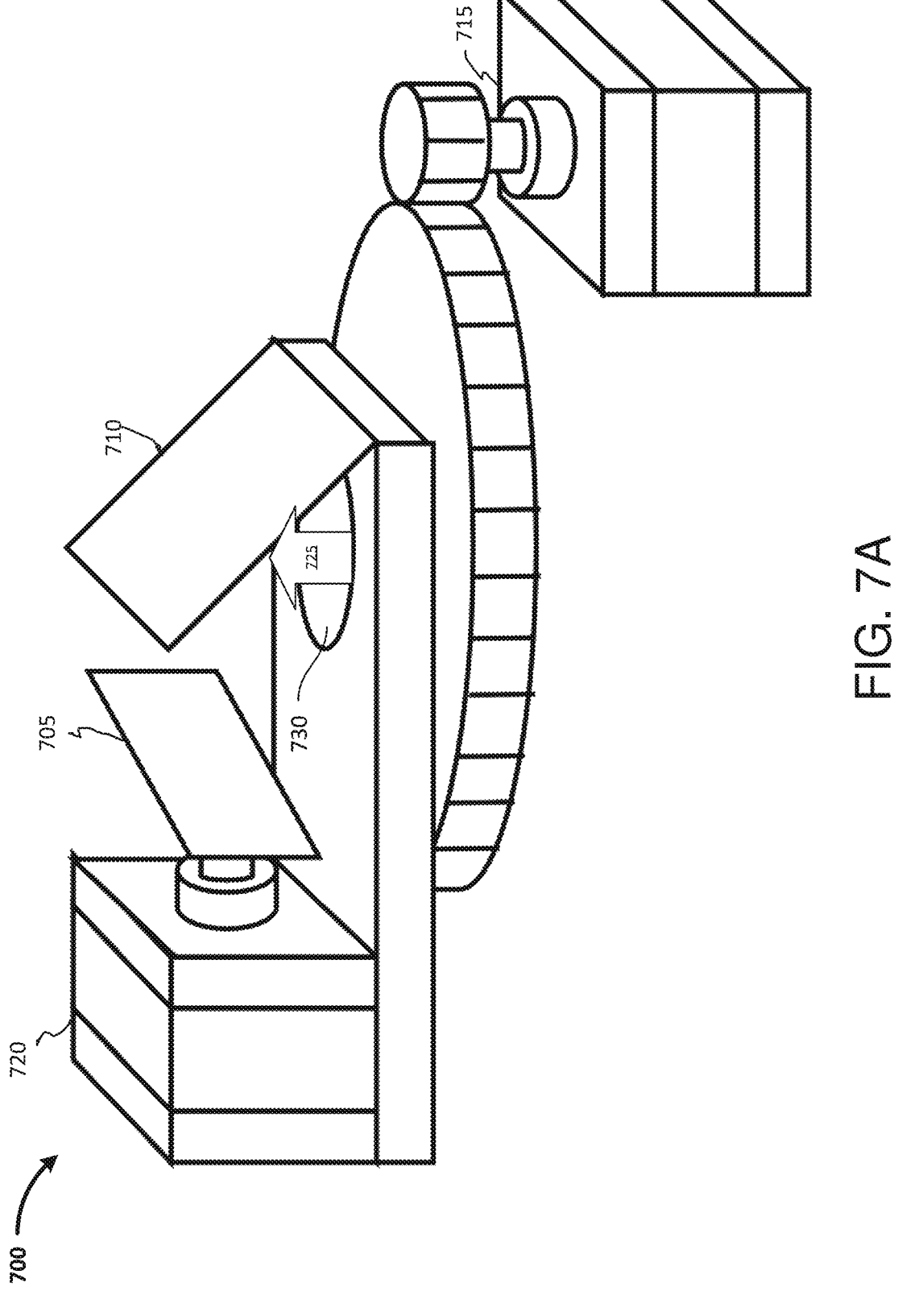
FIG. 7A, FIG. 7B, and FIG. 7C depict an exemplary beam transceiver unit.
Figure 7B:
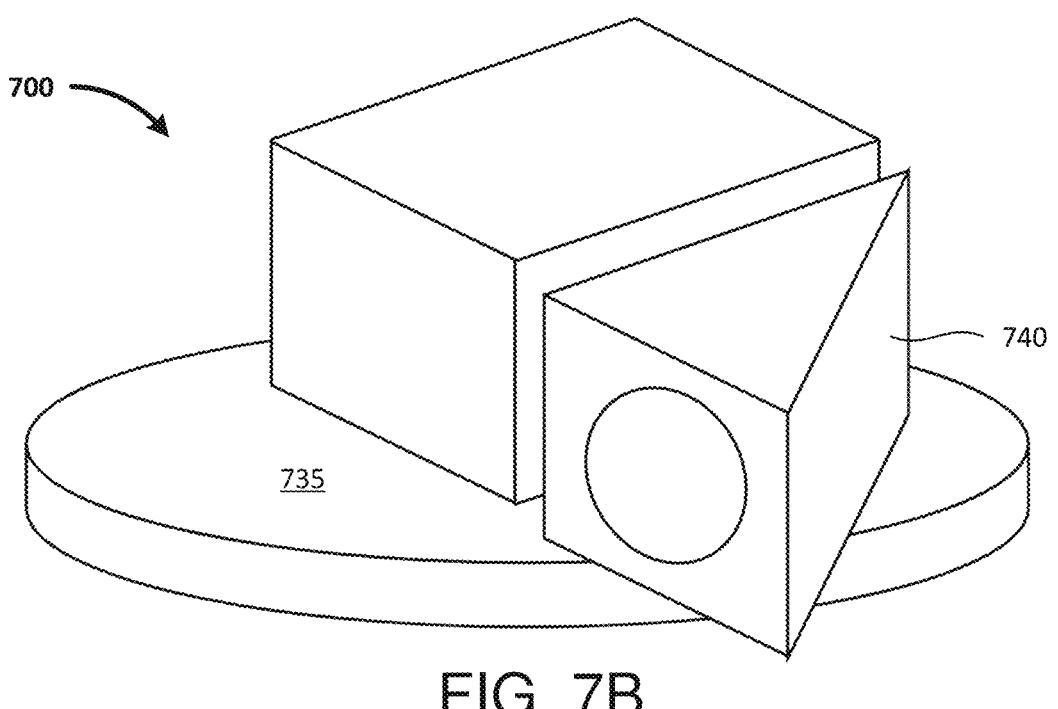
Figure 7C:
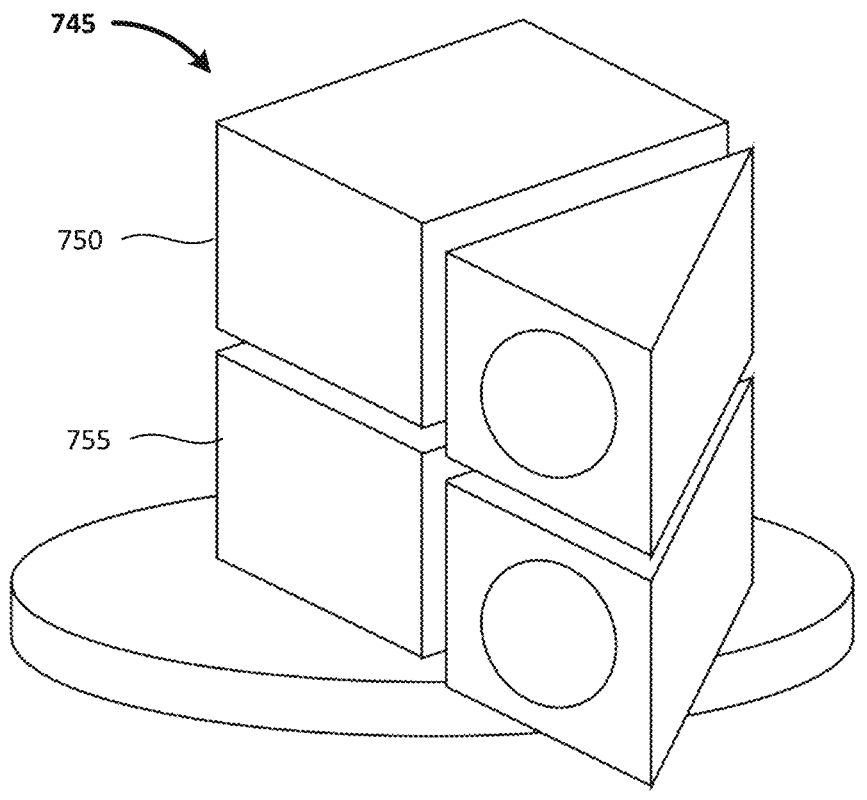

FIG. 7A, FIG. 7B, and FIG. 7C depict an exemplary beam transceiver unit (BTU 700). As shown in FIG. 7A, in an internal of the BTU 700, the BTU 700 includes a pair of mirrors (a first mirror 705 and a second mirror 710). In this example, the first mirror 705 and the second mirror 710 are mounted at 45 degrees offsets to control both the elevation and azimuth of the beam. For example, the BTU 700 may be steerable (e.g., using a servo motor, a step motor). The BTU 700 includes servo motors 715, 720 to control the direction of the mirrors 705, 710. The servo motors 715, 720 may include planetary servos, brushless drivers, with external or planetary gears to increase precision or slewing rate, depending on application.

As an illustrative example without limitation, a light beam 725 may enter from the base of the turret, through the hole in a gear 730. For example, the light beam 725 may reflect off the mirrors 710 towards the mirrors 705. The first mirror 705 may include an electrochromic reflector configured to regulate an amount of light transmitted and/or an amount of light reflected from the first mirror 705. For example, the first mirror 705 and the second mirror 710 may both be controlled by a stepper motor in the example shown.

In some implementations, the BTU 700 may be configured to receive signals (e.g., from a second facility, the 100*d*//blocked by a cloud). For example, the signals may include a power request signal. For example, the beam concentrator (e.g., the concentrator 110*c*) may be operated to reflect the received solar energy to the second solar power network upon receiving the power request signal.

FIG. 7B shows an external view of the BTU 700. The BTU 700, for example, may be used to receive, transmit or both transmit and receive a collimated beam of light. For example, a base 735 of the BTU 700 may rotate for yaw control. For example, the BTU 700 may receive light from any direction. For example, a head 740 may swivel up and down for pitch control.

FIG. 7C shows an exemplary twin headed BTU 745. For example, the exemplary twin headed BTU 745 may include a pair of BTU modules 750, 755 stacked on top of one another. For example, the BTU modules 750, 755 may independently swing. For example, the exemplary twin headed BTU 745 may advantageously allow for transmission and/or collection of light beams.

Figure 8:
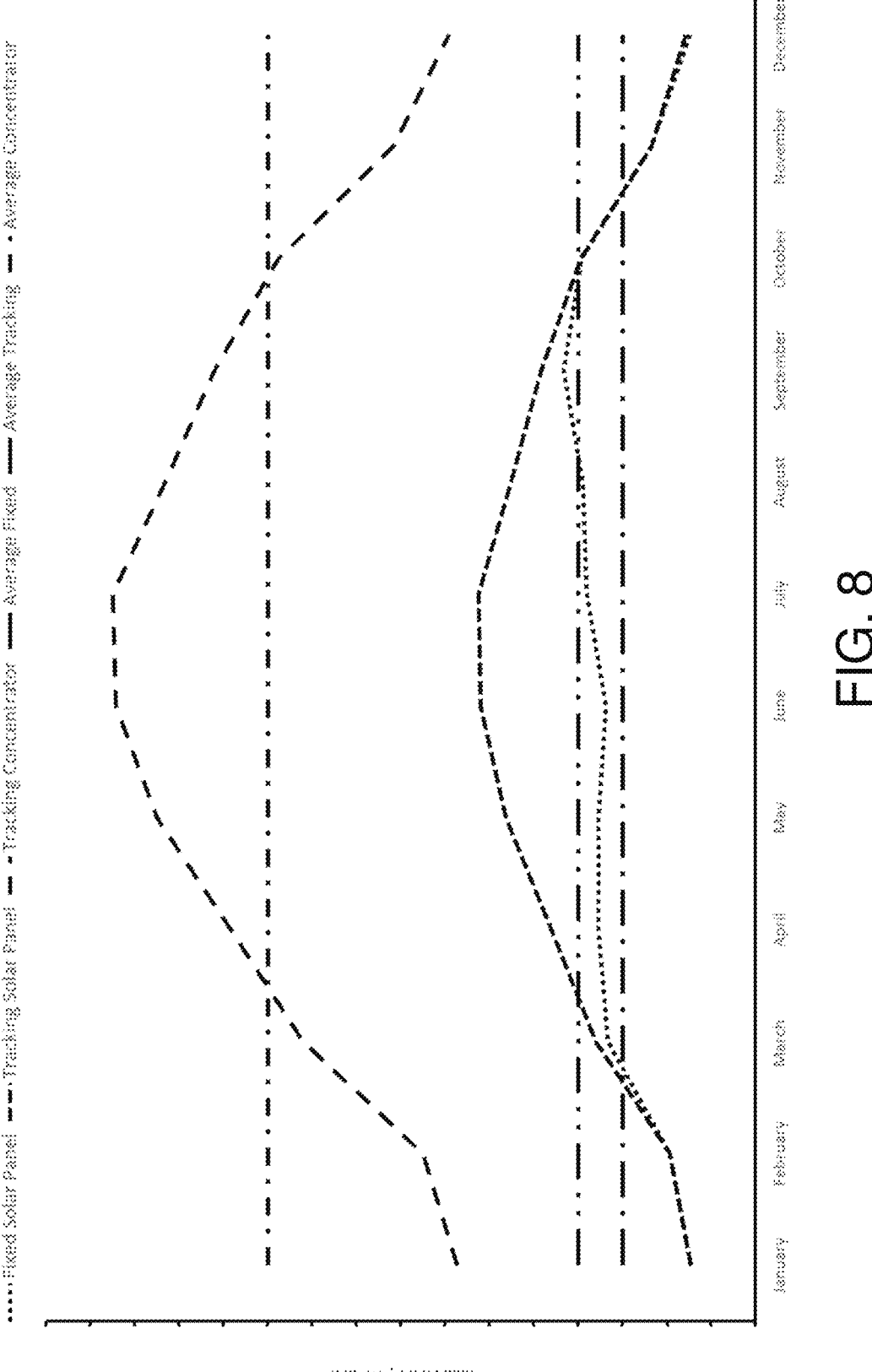
FIG. 8 is a graph showing output power of exemplary solar panels.

FIG. 8 is a graph showing output power of exemplary solar panels. As shown, using a tracking concentrator (e.g., the MSC 300), a power output may be greater than using a fixed solar panel or a tracking solar panel at various months under different climate conditions. For example, the graph may show a comparison between a tracking solar panel, a non-tracking solar panel (e.g., fixed), and a tracking concentrator. For example, a tracking concentrator may have a higher efficiency.

Figure 9B:
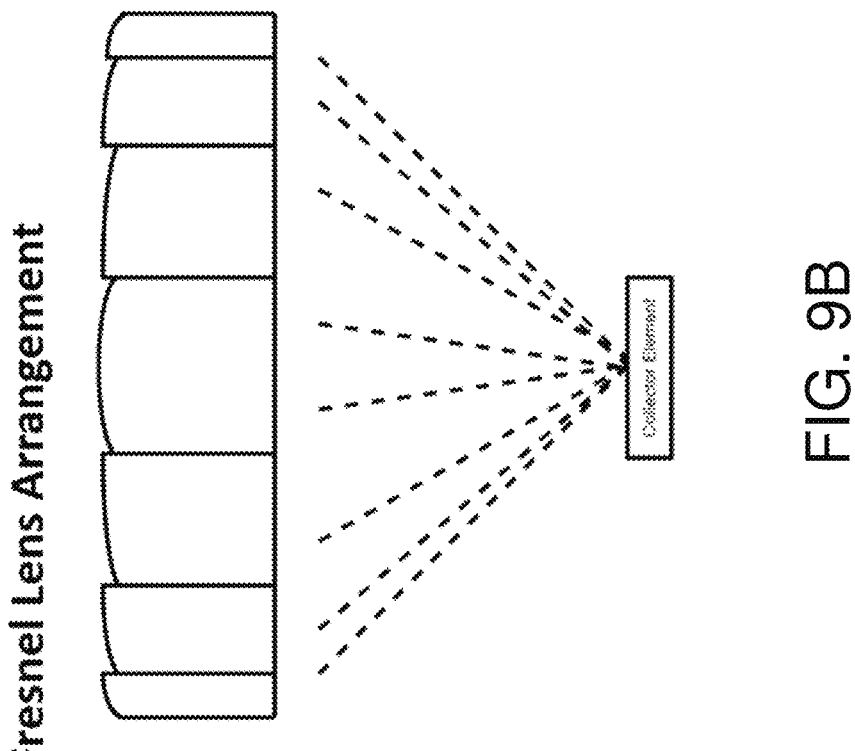
FIG. 9A and FIG. 9B depict exemplary beam collecting lens arrangements.
Figure 9A:
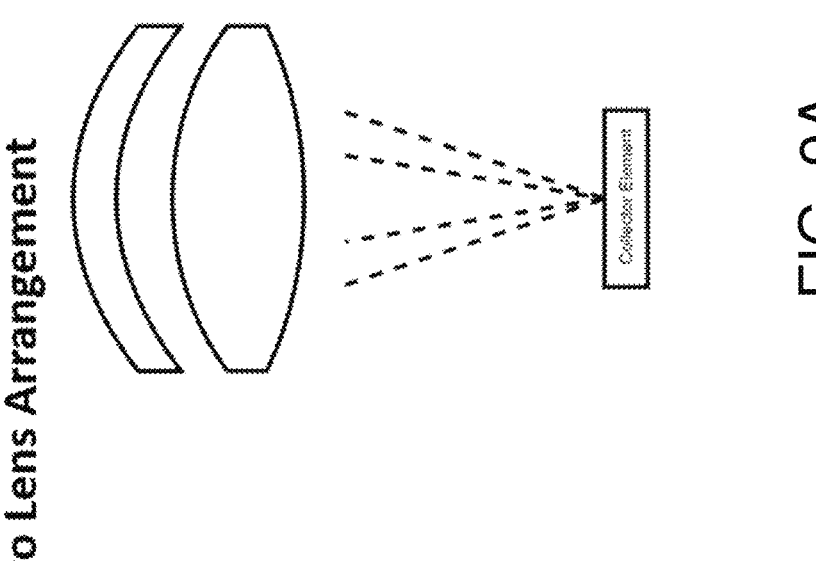

FIG. 9A and FIG. 9B depict exemplary beam collecting lens arrangements.

Figure 10:
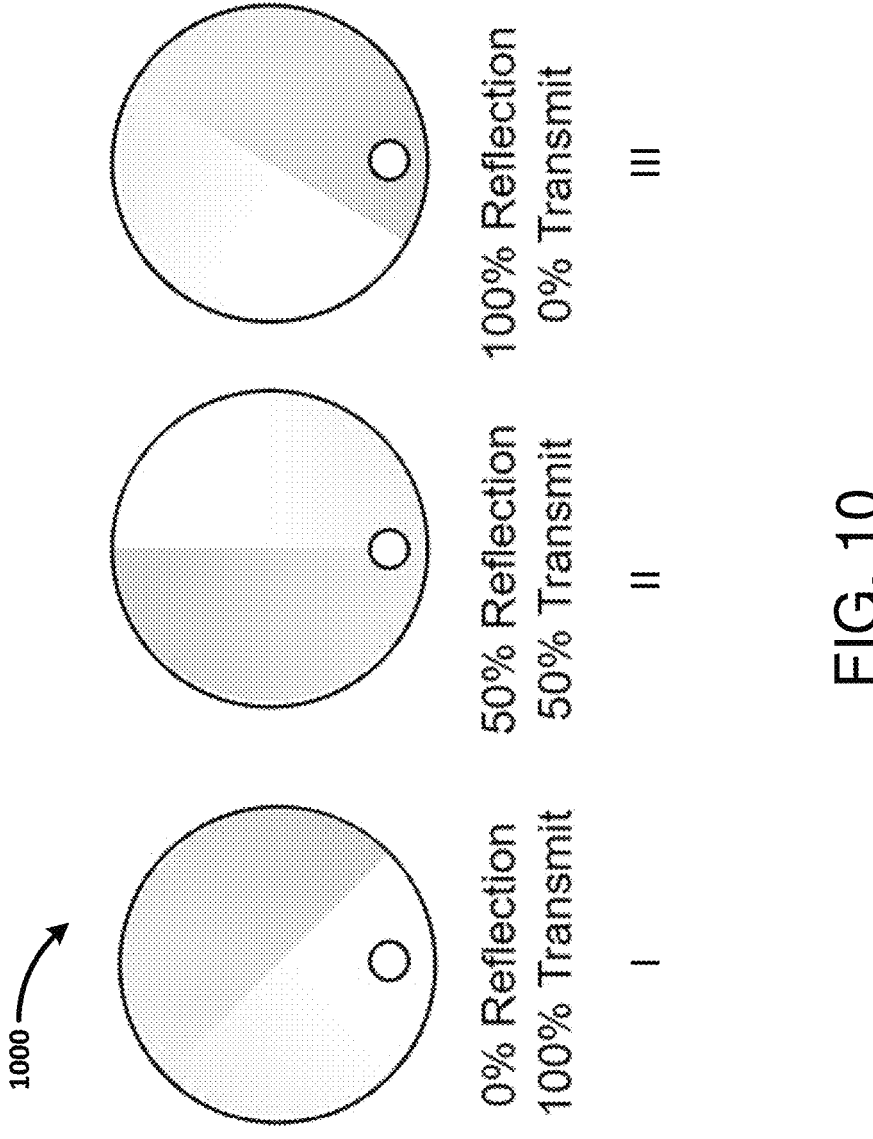
FIG. 10 shows exemplary states (I, II, III) of an exemplary rotary variable intensity adjustment reflector (RVIAR).

FIG. 10 shows exemplary states (I, II, III) of an exemplary rotary variable intensity adjustment reflector (RVIAR 1000). As discussed with reference to FIGS. 2 and 5, the RVIAR 1000 may be used at various points of the system to divert some light from one purpose to another. For example, the RVIAR 1000 may include coatings to allow certain frequencies to continue to pass through, or to reflect in a nonlinear function. As an illustrative example, the servo motors 715, 720 may rotate the RVIAR 1000 to utilize a determined portion of a received beam and reflect a remaining portion of the received beam to, for example, a next power station. Various configurations may advantageously allow for more complex applications of the PETACS 125.

Figure 11:
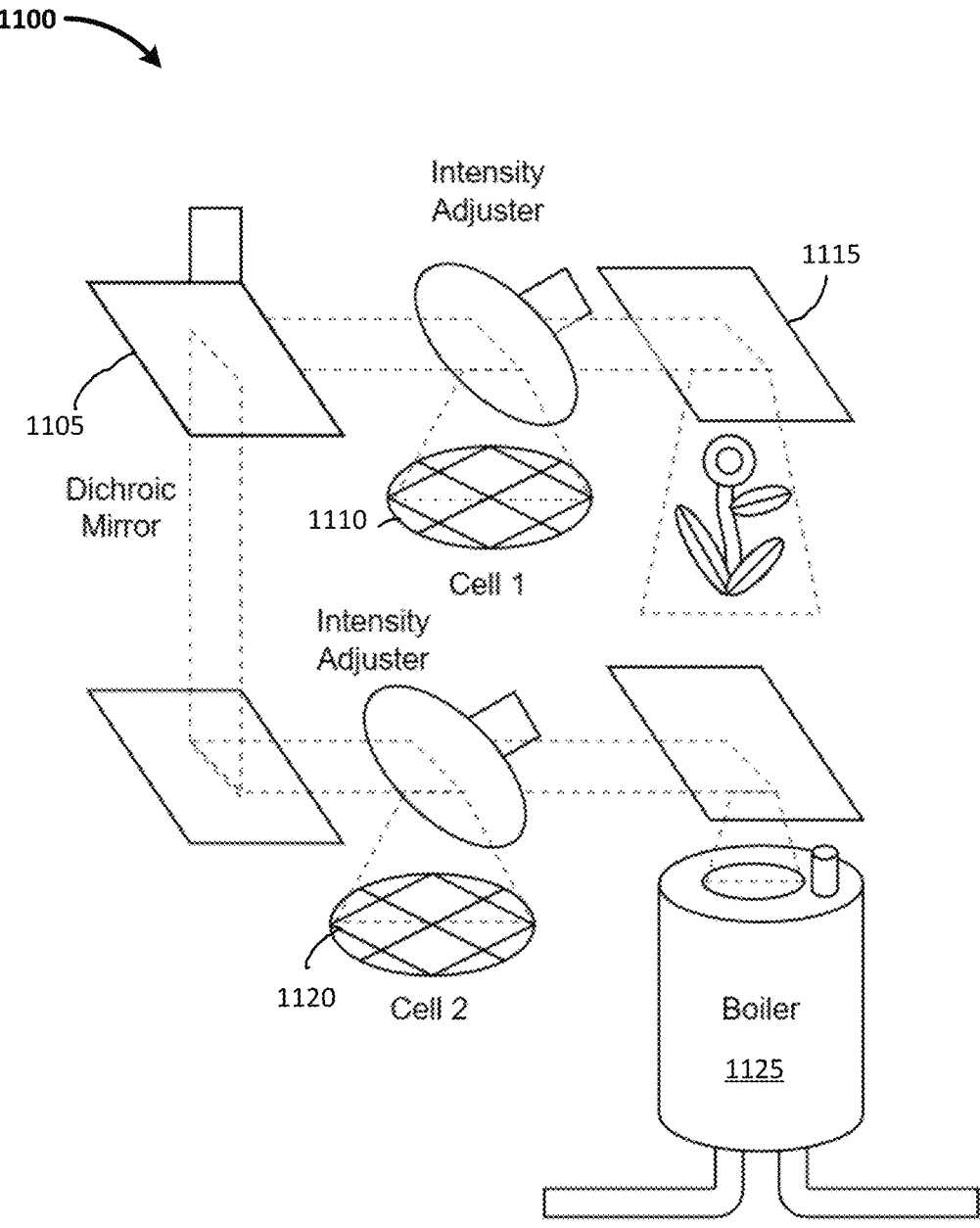
FIG. 11 depicts an exemplary polarizing beam multiplexing system for multiple simultaneous uses.

FIG. 11 depicts an exemplary polarizing beam multiplexing system (PBMS 1100) for multiple simultaneous uses. The PBMS 1100 includes applications for a combined electrical, water heater/boiler, and aeroponics. A dichroic mirror 1105 splits the beam incoming from a concentrator (e.g., the MSC 300) into two beams, one optimized for a multi-junction cell 1110 and a Chlorophyll unit, algae, or plant 1115 for photosynthesis, and a second beam optimized for a cell 1120 and water infrared absorption for a boiler 1125.

Figure 12A:
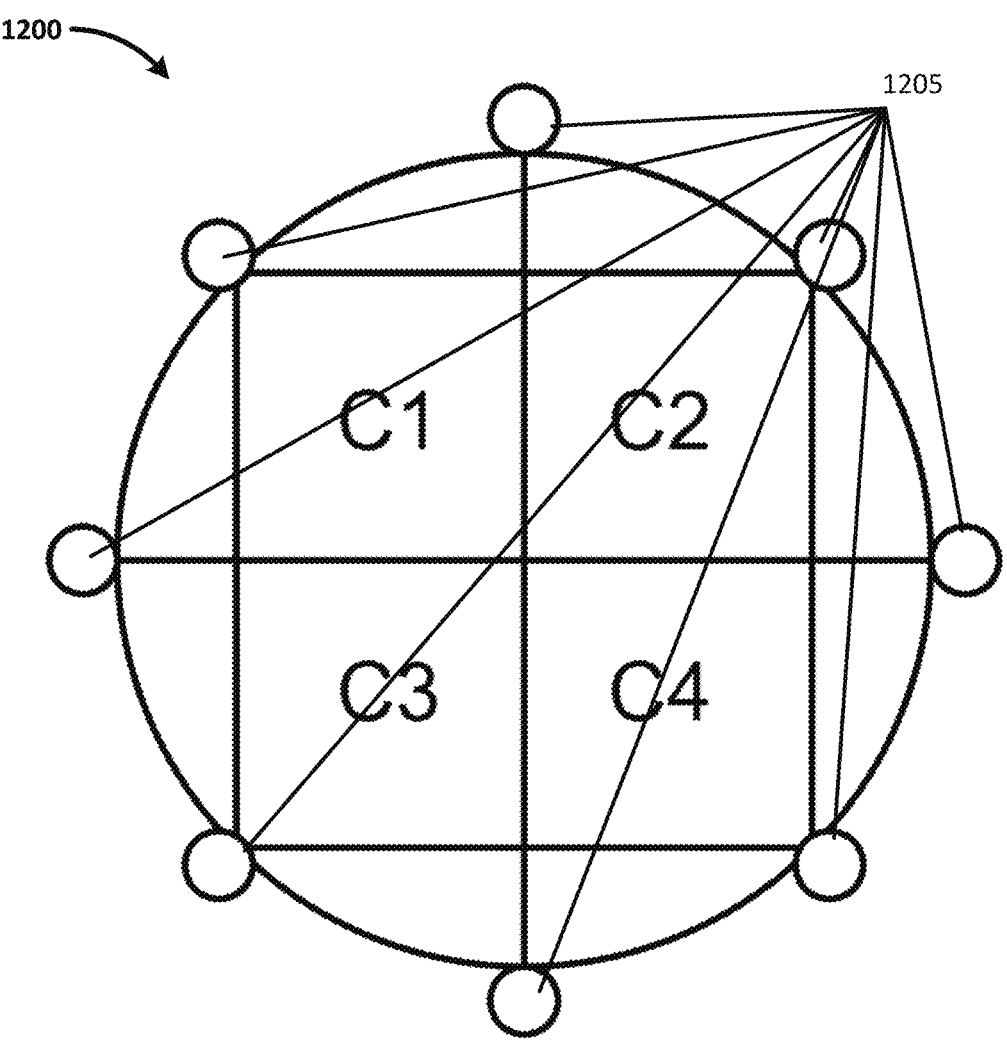
FIG. 12A, FIG. 12B, and FIG. 12C depict exemplary photovoltaic cell assemblies including multiple photovoltaic cells.
Figure 12B:
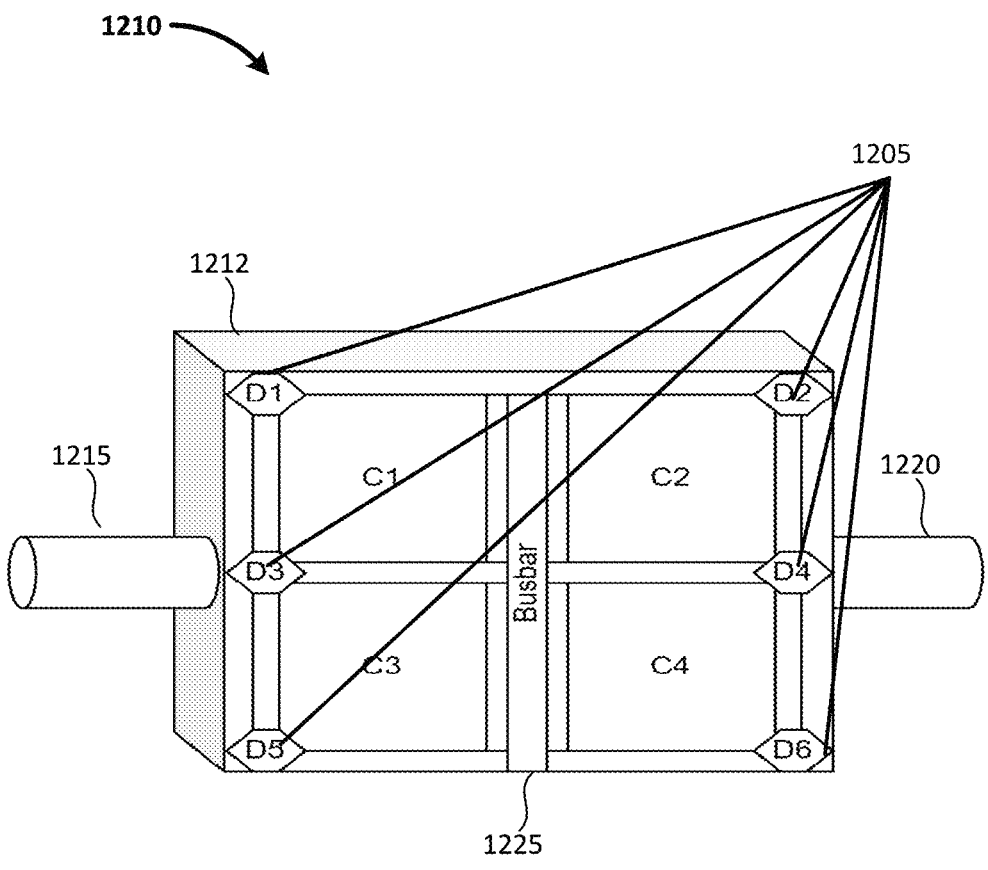
Figure 12C:
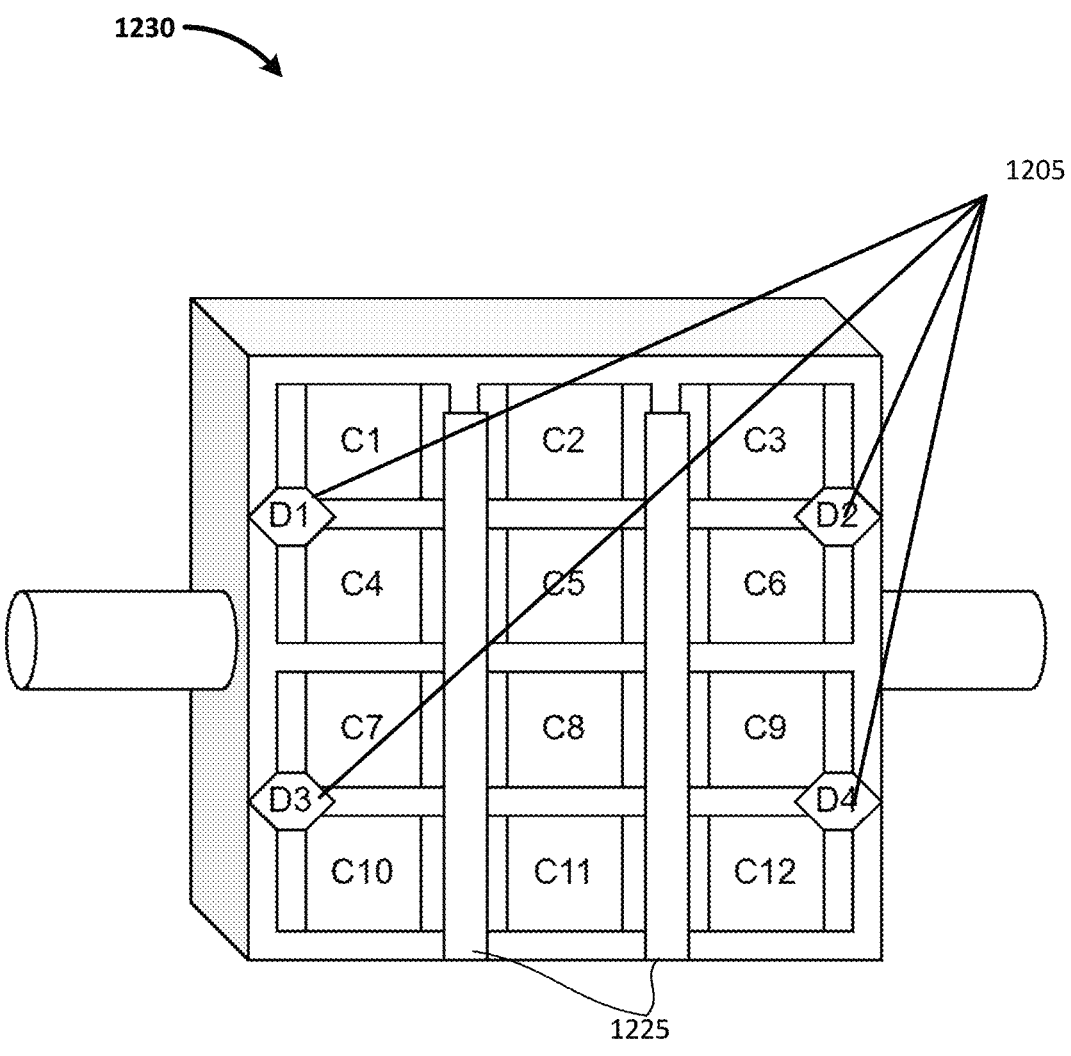

FIG. 12A, FIG. 12B, and FIG. 12C depict exemplary photovoltaic cell assemblies including multiple photovoltaic cells. For example, the photovoltaic cell assemblies may include small photodiodes. For example, the photovoltaic cell assemblies may include photoresistors. For example, the photovoltaic cell assemblies may use the small photodiodes to assist in beam steering. For example, the photovoltaic cell assemblies may use the photoresistors to assist in beam steering.

As shown in FIG. 12A, a photovoltaic cell assembly 1200 includes photoresistors 1205 on a peripheral. The photoresistors 1205 may determine slight variations in power output from each cell, for example. In some implementations, the variation data may be sent to the transmitting unit to actively correct a beam transmission angle. For example, if C1 is generating more power than C4, the receiving unit may send a command to the transmitting unit to slew the beam slightly to the right and down.

As shown in FIG. 12B, a photovoltaic cell assembly 1210 may include a high energy photovoltaic collector 1212 and cooling tubes 1215, 1220 leading out of the photoresistors 1205 for flowing of cooling fluid. The photoresistors 1205 include a bus bar 1225 mounted to the high energy photovoltaic collector 1212 for electrical connection to each individual cell C1-C4. The photodiodes 1205 may be mounted at a side of the high energy photovoltaic collector 1212. Based on the different brightness in each cell, for example, the photoresistors 1205 may be adjusted (e.g., in position, in optical resistance) to maximize power collection and/or transmission. For example, an amperage from each individual cell may also be monitored to steer the collectors or beam directing units.

As shown in FIG. 12C, a photovoltaic cell assembly 1230 may include more cells C1-C12. In this example, additional units may be controlled by a controller connected to the photovoltaic cell assembly 1230.

In various embodiments, the photovoltaic cell assembly 1230 may include multiple photovoltaic cells (e.g., C1-4) configured to receive the at least two wavelength divided solar energy beams at a transmission angle. For example, the controller may include multiple photoresistors coupled to the plurality of photovoltaic cells. For example, the controller may determine a power output differential between the plurality of photovoltaic cells. For example, the beam collector may actively correct the transmission angle based on the power output differential.

Figure 13:
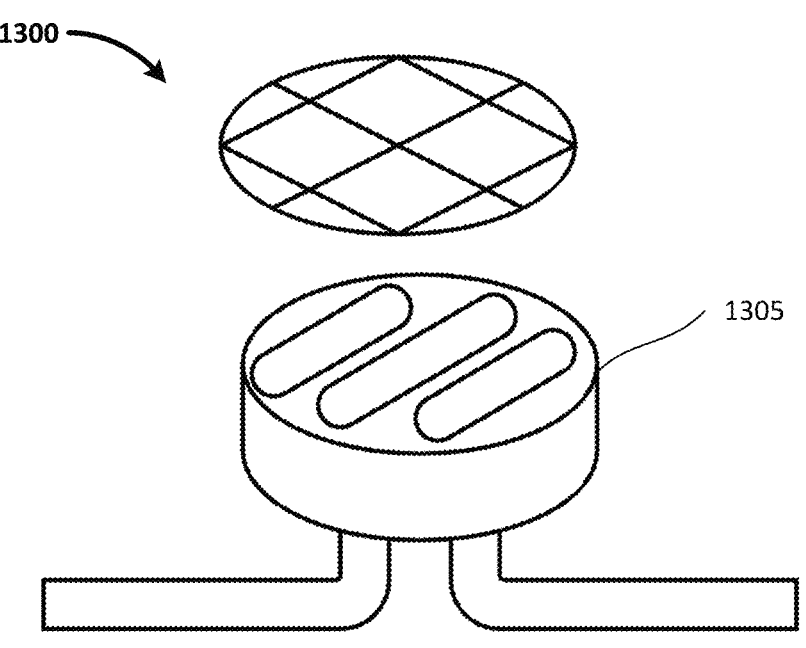
FIG. 13 and FIG. 14 depict one embodiment of an exemplary photovoltaic cell with various flow through and integral cooling systems.
Figure 14:
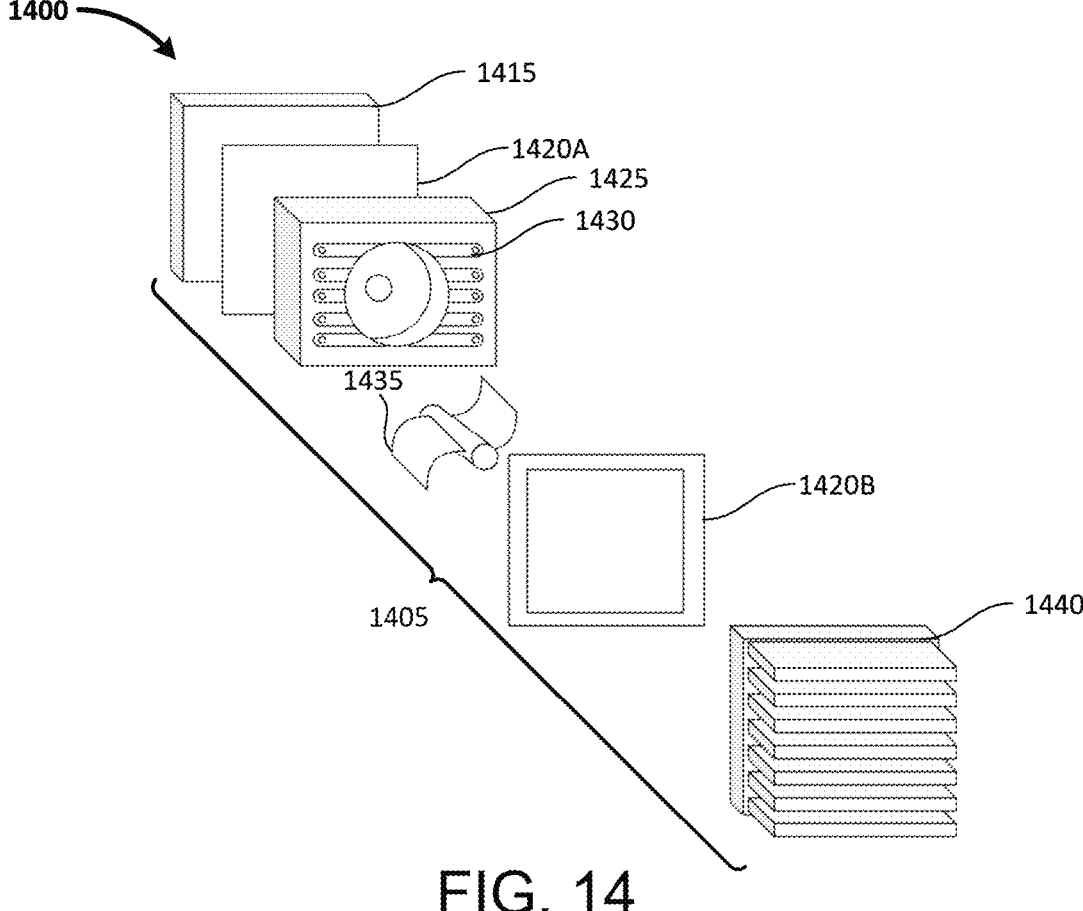

FIG. 13 and FIG. 14 depict one embodiment of an exemplary photovoltaic cell with various flow through and integral cooling systems.

As shown in FIG. 14, the photovoltaic cell 1400 includes a monolithic heat exchanger 1405 with liquid channels. In various embodiments, solar cells may be more efficient when operating in a cooler temperature. In some examples, the solar cells may be designed to operate below 110F. In this example, cooling liquid may run through traces and get rid of excess heat.

In the depicted example, the heat exchanger 1405 is provided with a mounting module 1415 (e.g., a block configured to thermally couple the photovoltaic cell 1400 to a cooling block). The mounting module 1415 is fluidly and thermally coupled to a flow module 1425. The flow module 1425 is provided with channels 1430 and a pump 1435 (e.g., compressor, an impeller). The flow module 1425 may, for example, be a single block (e.g., aluminum, copper) with the channels formed (e.g., machined) into it. Fluid may, for example, flow through the channels. The channels 1430 may, for example, be in fluid communication with mating channels in the mounting module 1415 and/or with an exchange module 1440. The exchange module 1440 may, as in the depicted example, have fins for exchange of heat between the fluid and a surrounding environment (e.g., ambient air). In the depicted example, the flow module and the mounting module 1415 are sealingly coupled by a gasket 1420A. In the depicted example, the exchange module 1440 and the flow module 1425 are fluidly coupled by a gasket 1420B. The gaskets 1420A and 1420B may, for example, have apertures (e.g., channels, holes, slots) that provide fluid communication between the respective modules. Alternate implementations include forced air cooling, ammonia cooling loops for space applications, or large surface area radiators.

Figure 15:
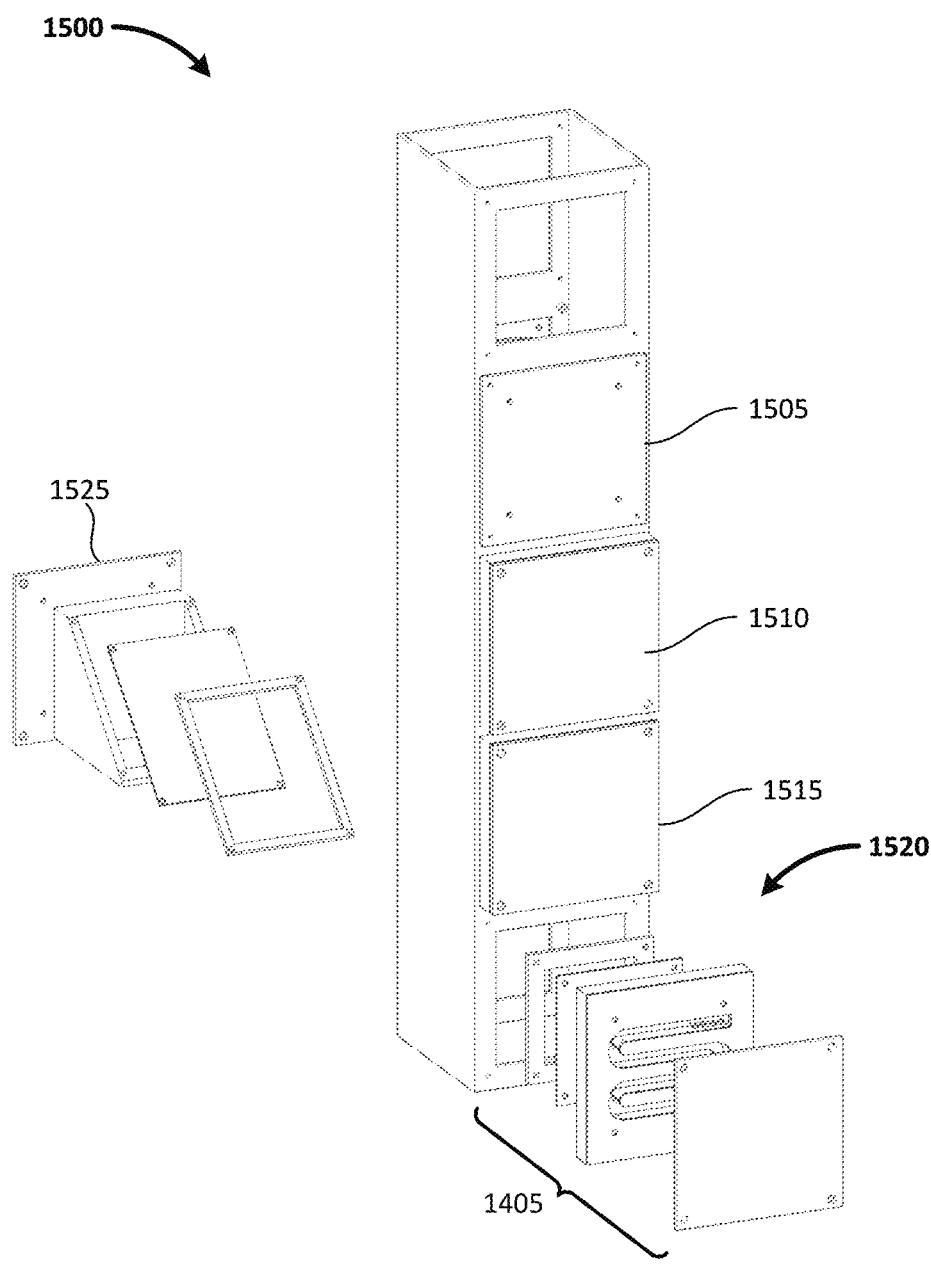
FIG. 15 depicts an exploded view of an exemplary optical filtration tower.

FIG. 15 depicts an exploded view of an exemplary optical filtration tower (OFT). In this example, the OFT 1500 includes an optical focusing element 1505 and two photovoltaic modules 1510, 1515. A third photovoltaic module 1520 is shown with a dichroic optical filter 1525 removed from the rear of the OFT 1500. As shown, the third photovoltaic module 1520 includes the monolithic heat exchanger 1405 for integral cooling.

Figure 16:
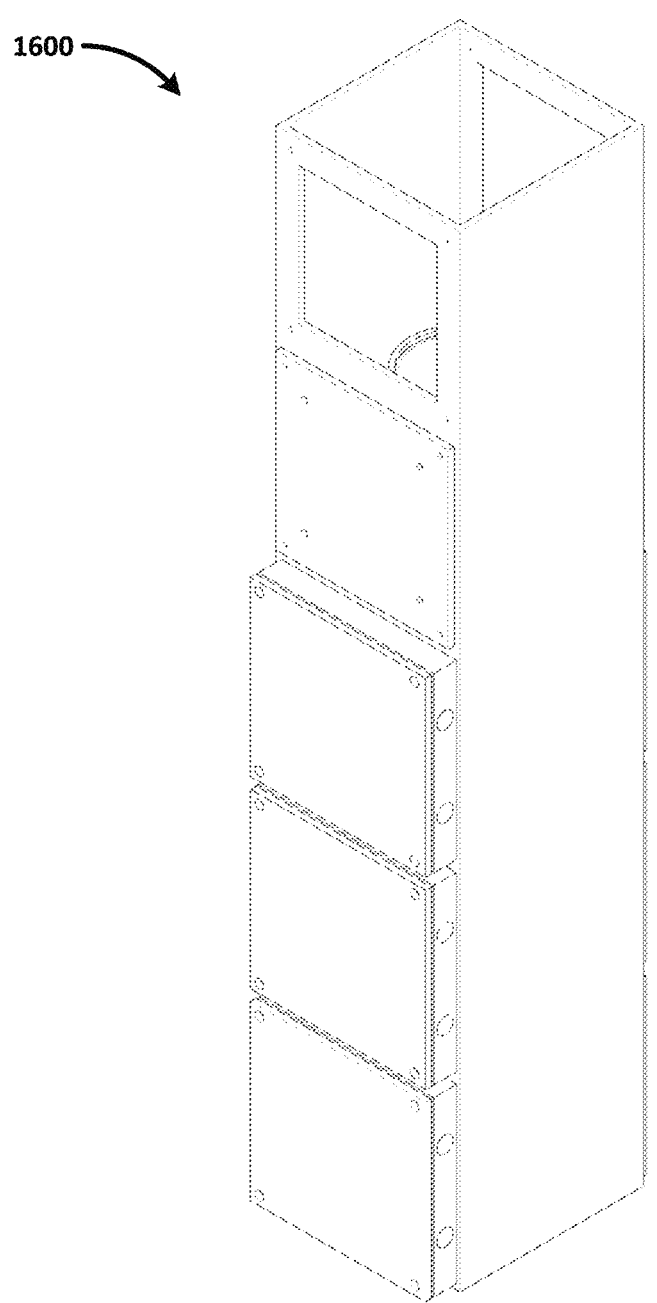
FIG. 16 depicts an exemplary optical tower.

FIG. 16 depicts an exemplary optical filtration tower 1600 (e.g., the OFT 1500). For example, the 1600//may include bolt holes for servicing. For example, the 1600//may include the ports for connecting cooling fluid lines.

Figure 17:
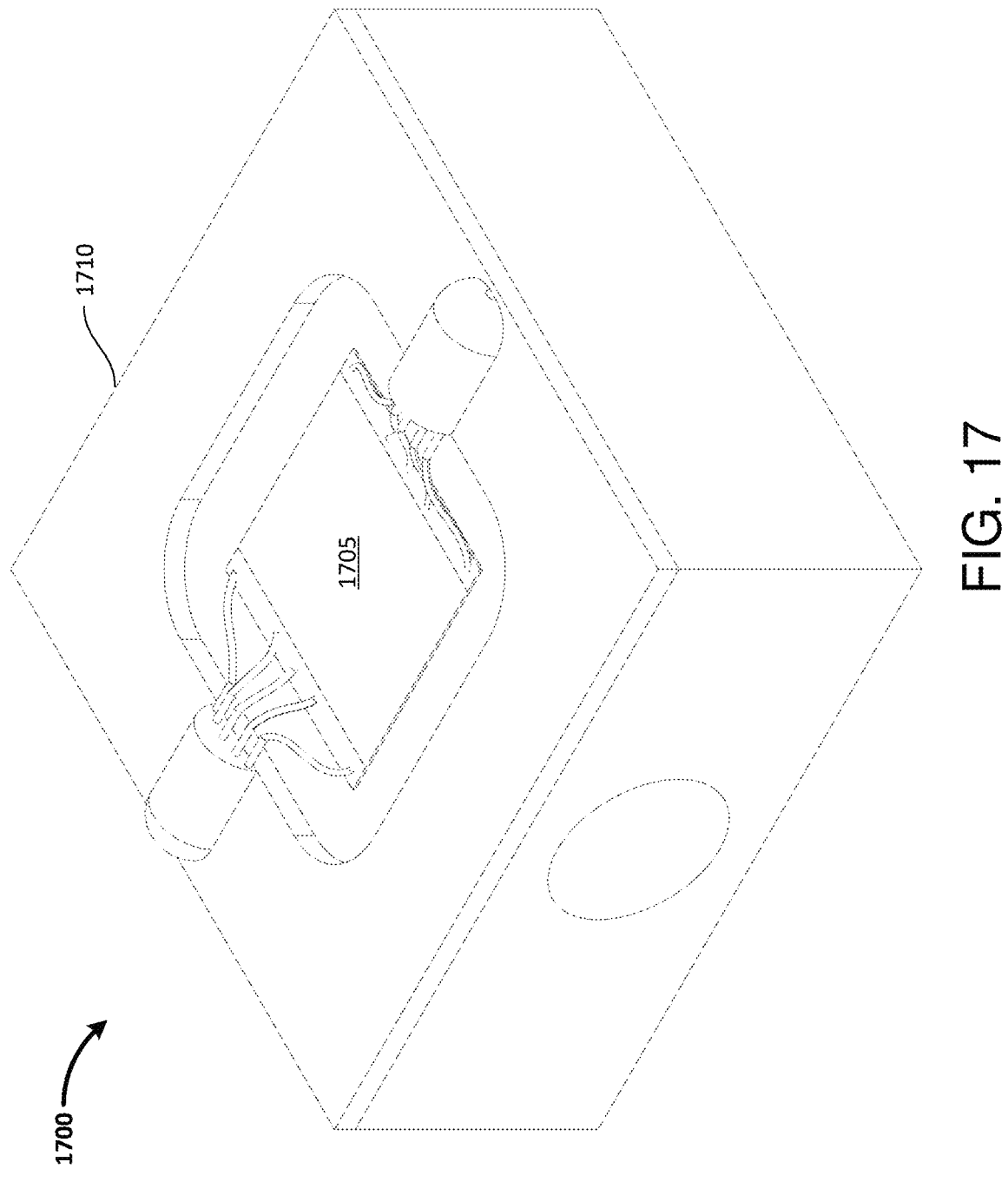
FIG. 17 depicts an exemplary flow through a cooling block with a photovoltaic cell mounted to it.

FIG. 17 depicts an exemplary flow through a cooling block with a photovoltaic cell mounted to it. As shown, a photovoltaic chip assembly 1705 may directly be mounted to a thermally conductive block 1710. For example, a hole at a center may be connected to a hose barb or other fluid line connection for cooling.

FIG. 18A, FIG. 18B, FIG. 18C, FIG. 18D, FIG. 18E, FIG. 18F, and FIG. 18G are block diagrams depicting an exemplary satellite power relay system.

Figures 18A, 18B, 18C:
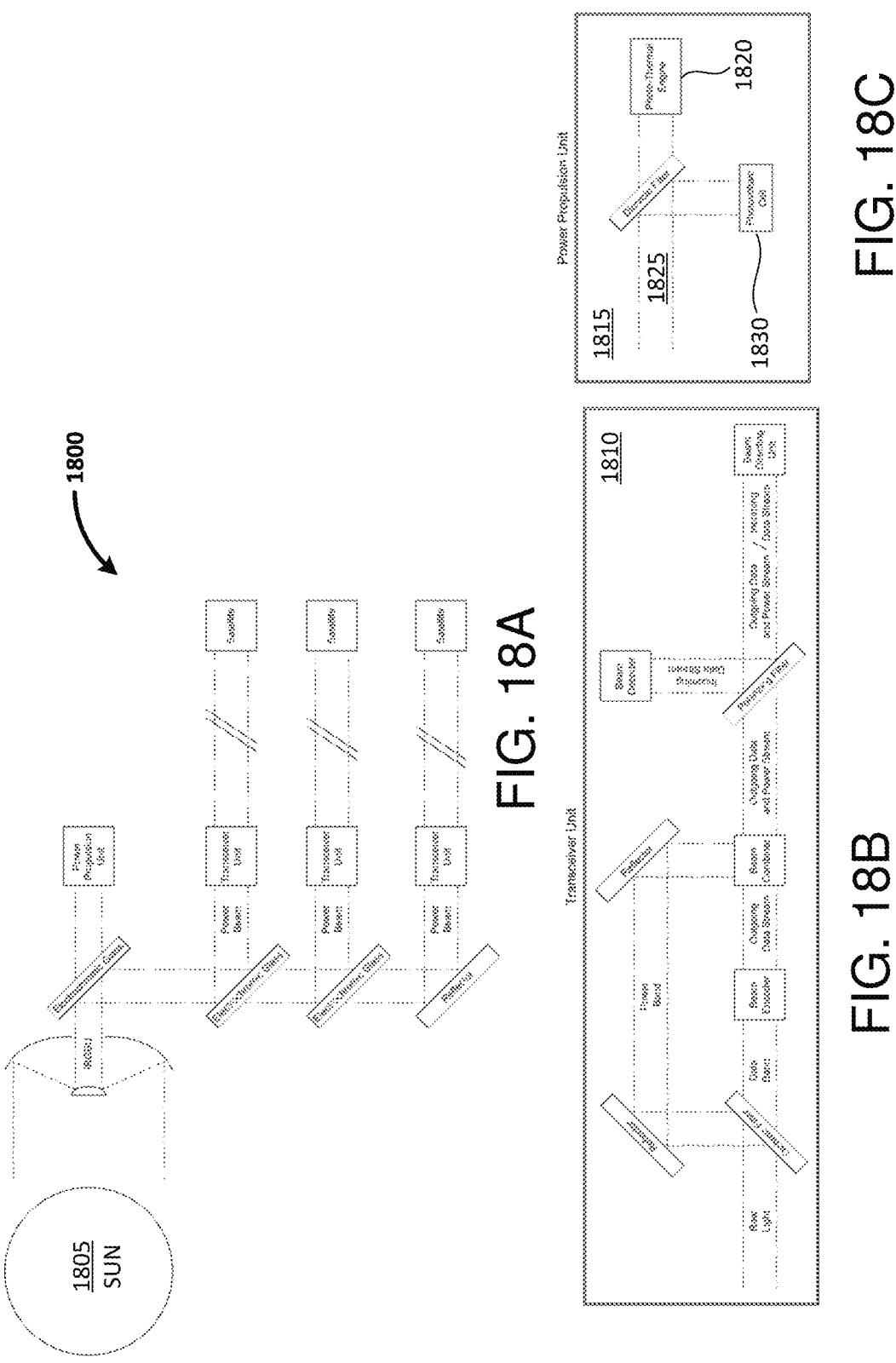
FIG. 18A, FIG. 18B, FIG. 18C, FIG. 18D, FIG. 18E, FIG. 18F, and FIG. 18G are block diagrams depicting an exemplary satellite power relay system.

FIG. 18A shows an exemplary SPRS 1800 configured to receive energy from the sun 1805. For example, the SPRS 1800 may include a method to collect data from a space platform closest to the sun. For example, the SPRS 1800 may include a method to concentrate power. For example, the SPRS 1800 may include a method to separate sunlight into multiple bands. For example, the SPRS 1800 may include a method to control how much sunlight is used for onboard power and the amount to be relayed to a next satellite. For example, the SPRS 1800 may include a method to mix outgoing data with power band for transmission. For example, the SPRS 1800 may include a method to transmit power and data while receiving incoming data.

FIG. 18B shows an exemplary BTU 1810 of the SPRS 1800. For example, the BTU 1810 may receive raw light. For example, the BTU 1810 may receive incoming data streams. For example, the BTU may generate outgoing data and power streams.

FIG. 18C shows an exemplary power propulsion unit (PPU 1815). For example, the PPU may be used to supply power to a photo-thermal engine 1820 using an incoming beam 1825 and energy from a photovoltaic cell 1830.

Figure 18D:
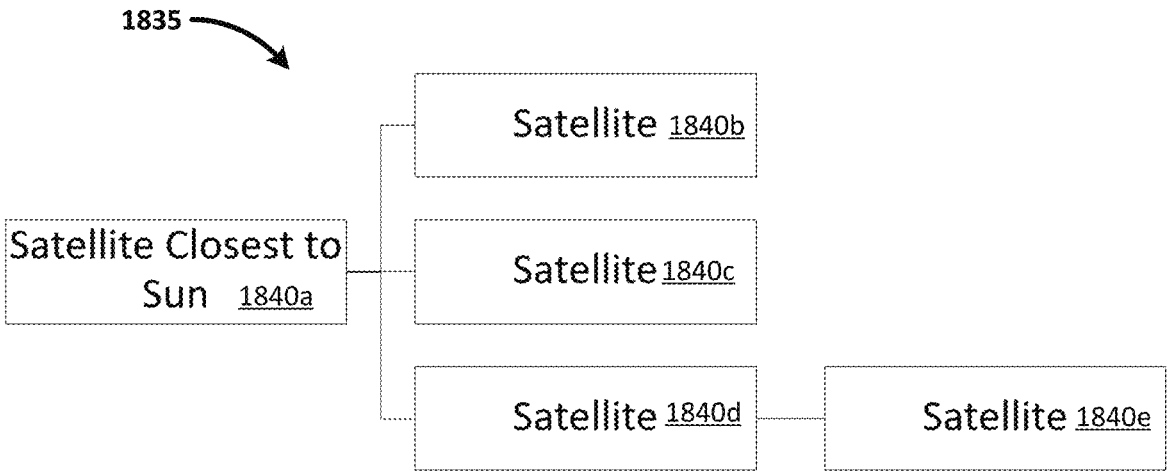
Figure 18E:
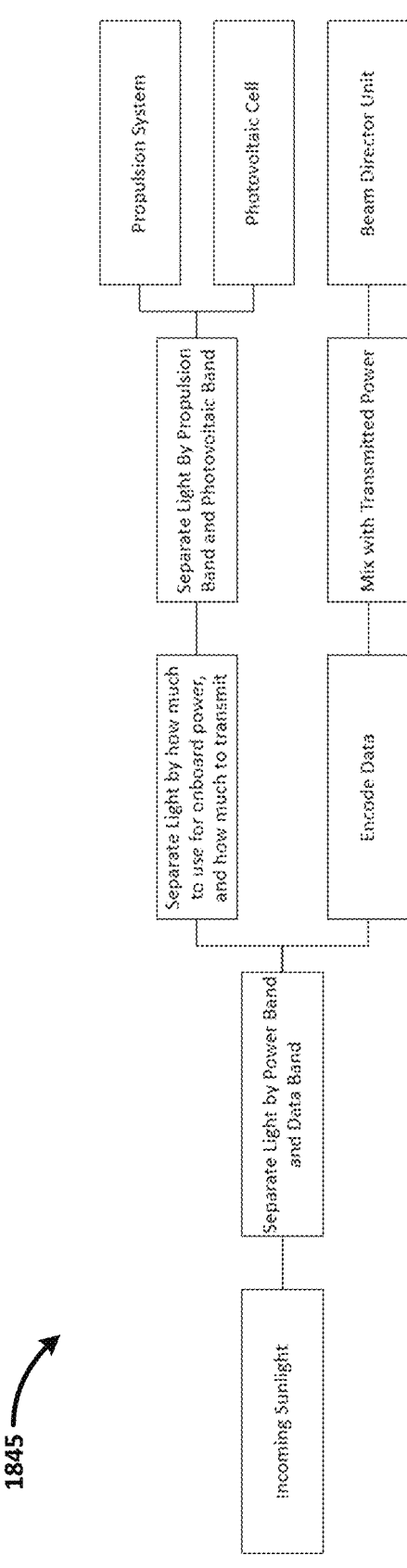
Figure 18F:
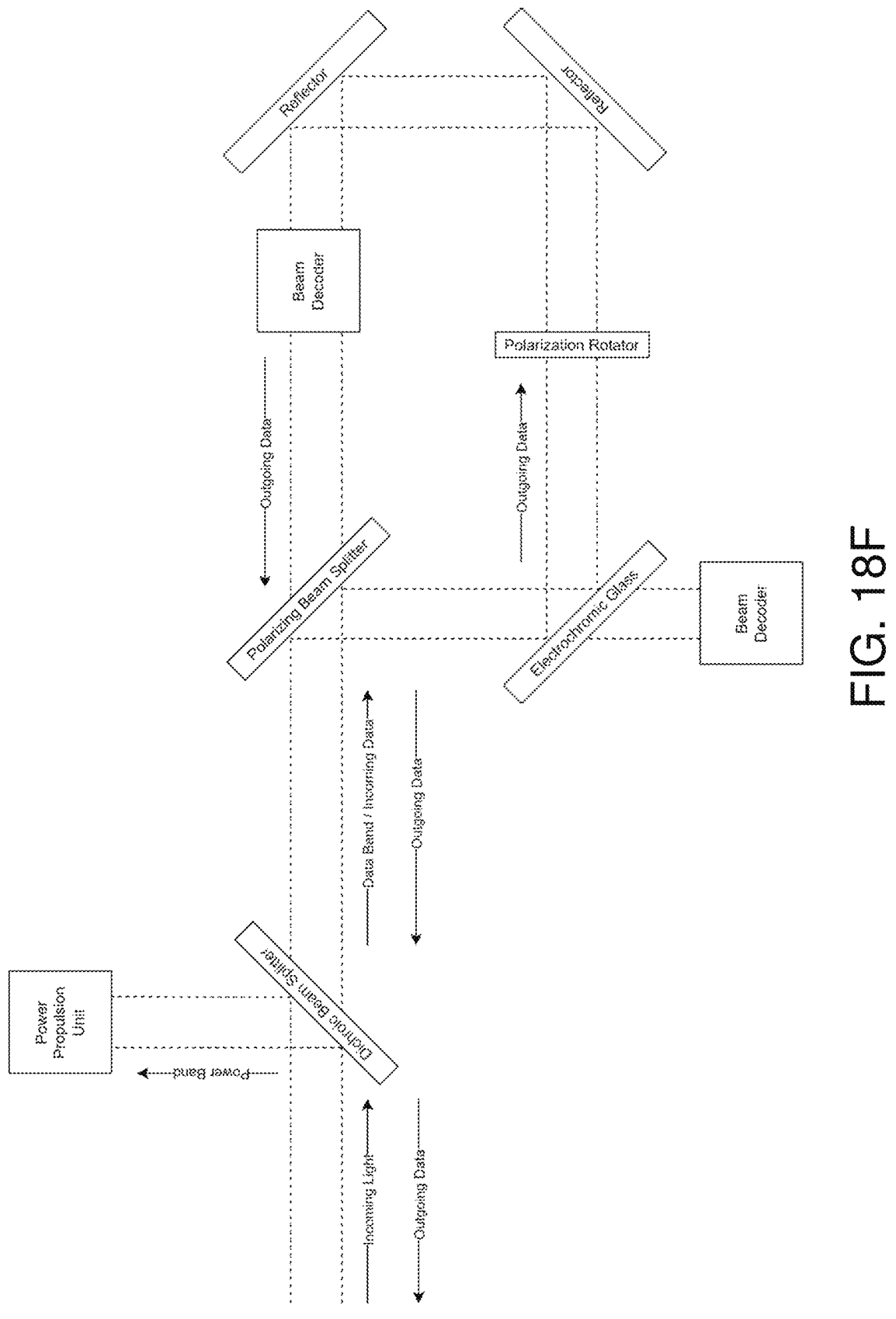
Figure 18G:
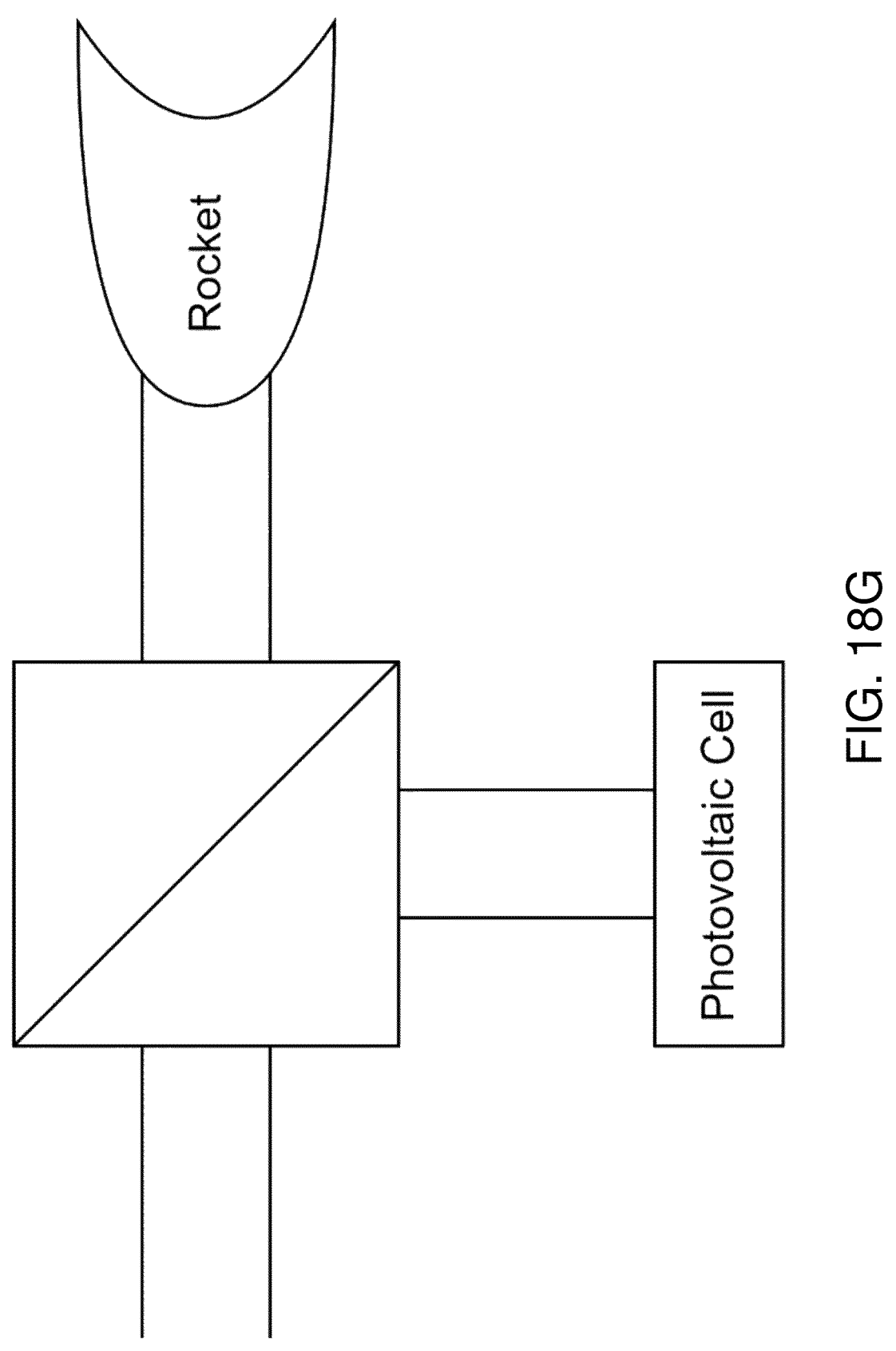

FIG. 18D shows an exemplary satellite system 1835 for relaying energy and data between various satellites 1840. FIG. 18E is a flow diagram showing an exemplary method 1845 of processing an incoming beam (e.g., an incoming sunlight). FIG. 18F shows an exemplary system using an exemplary power propulsion unit. FIG. 18G shows an exemplary system having an exemplary rocket and a photovoltaic cell.

Figure 19:
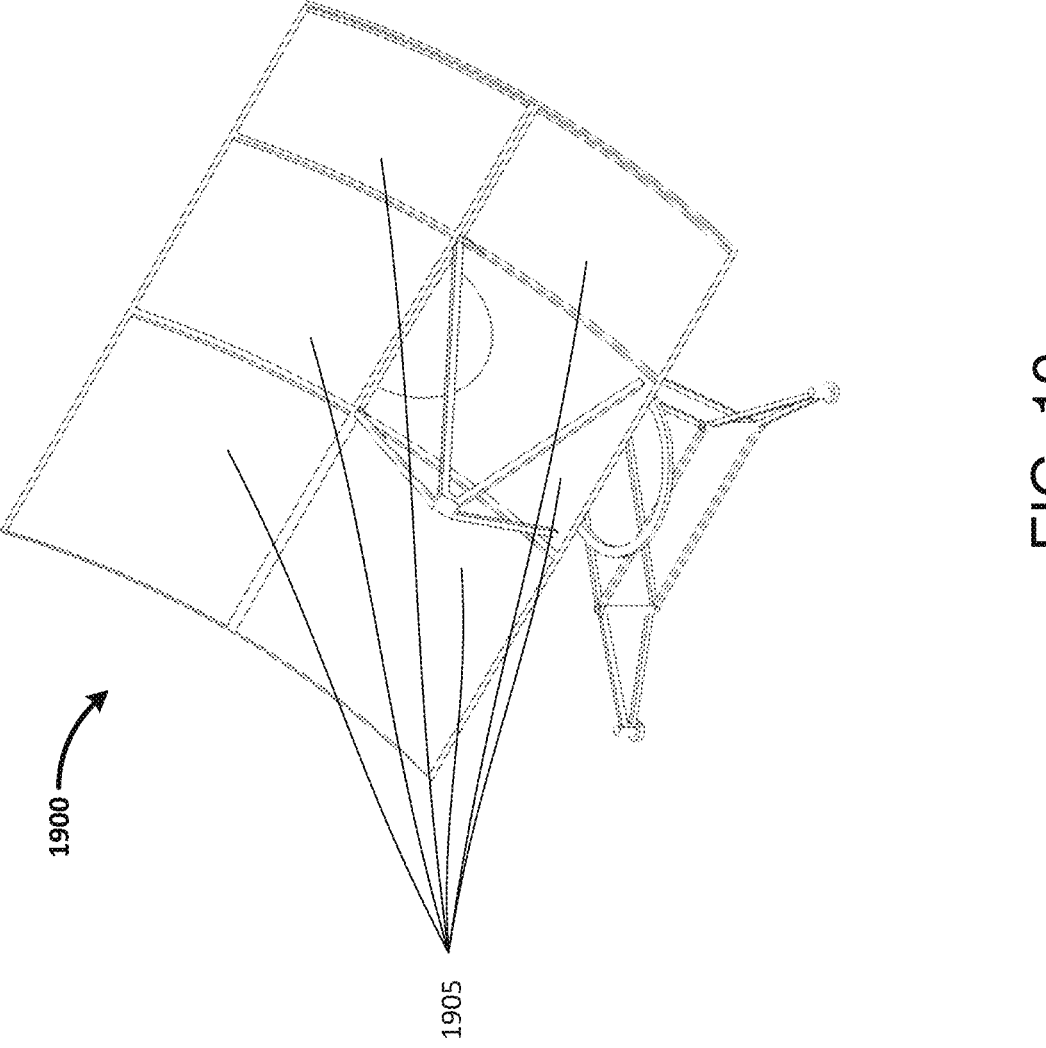
FIG. 19 depicts an exemplary tripod mounted six-segment solar collector.

FIG. 19 depicts an exemplary tripod mounted six-segment solar collector. In this example, a solar collector 1900 includes 6 reflective segments 1905. For example, the reflective segments 1905 may be made of aluminum. For example, the reflective segments 1905 may be made of glass. For example, the reflective segments 1905 may be made of steel. For example, the reflective segments 1905 may be made of beryllium. For example, the reflective segments 1905 may be made of gold. For example, the reflective segments 1905 may be made of other reflective materials (e.g., polymer, ceramic, or a material covered by a reflective coating). In some implementations, the solar collector 1900 may include servo motors in its base, and/or a linear actuator to control pitch.

Figure 20A:
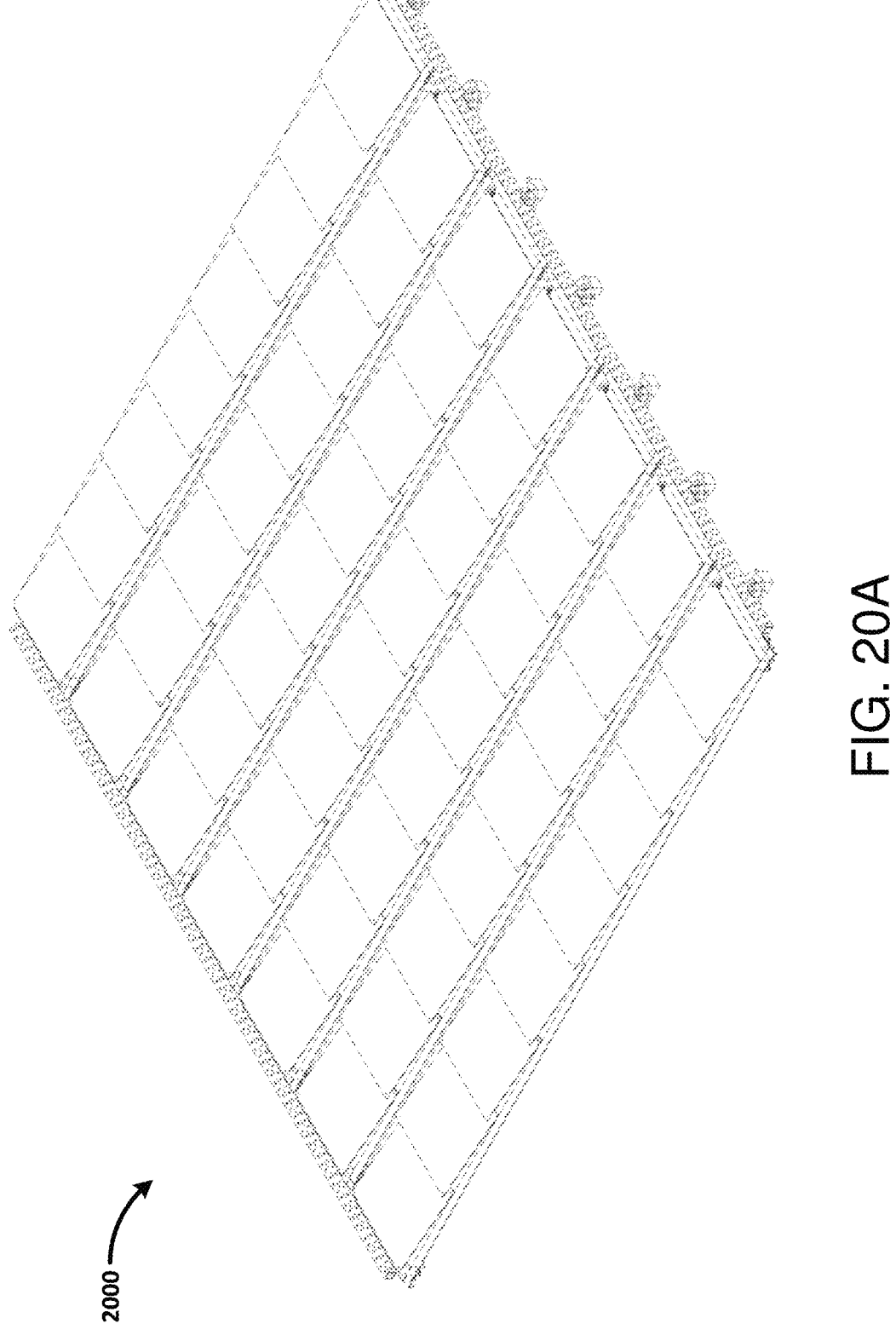
FIG. 20A and FIG. 20B depict an exemplary tilting array of reflective panels.
Figure 20B:

FIG. 20A and FIG. 20B depict an exemplary tilting array of reflective panels. As shown in FIG. 20A, a concentrating assembly 2000 includes 7×8 of reflective panels. For example, each row of reflective panels may be independently controlled by a servo or a stepper motor. For example, the entire array may be adjusted for North and South. (e.g., to account for seasonal changes) by a simple hand crank, a gearbox, linear actuators, hydraulics, pneumatics, or a combination thereof. In some examples, the concentrating assembly 2000 may form effectively a Fresnel Reflector. Various embodiments may pertain to conventional solar panels.

Figure 21:
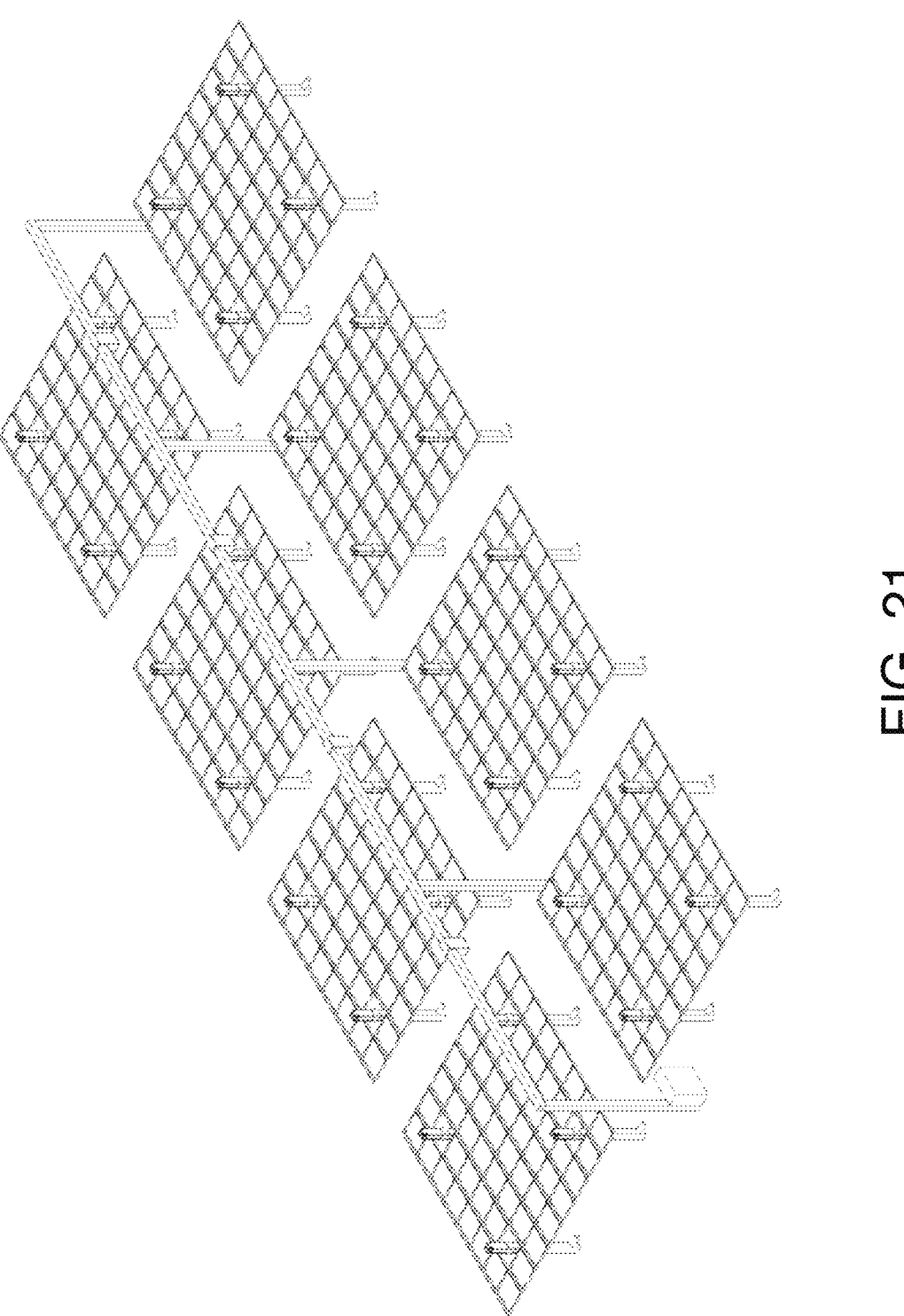
FIG. 21 depicts an exemplary system having eight exemplary arrays of reflective panels as described with reference to FIGS. 20A-B.

As shown in FIG. 20B, a close-up view of one of the reflective panels 2005 of the concentrating assembly 2000 is shown. In this example, movements of the reflective panels 2005 may be controlled by one or more servo motors 2010. FIG. 21 depicts an exemplary system having eight exemplary arrays of reflective panels as described with reference to FIGS. 20A-B.

Figures 22A, 22B, 22C:
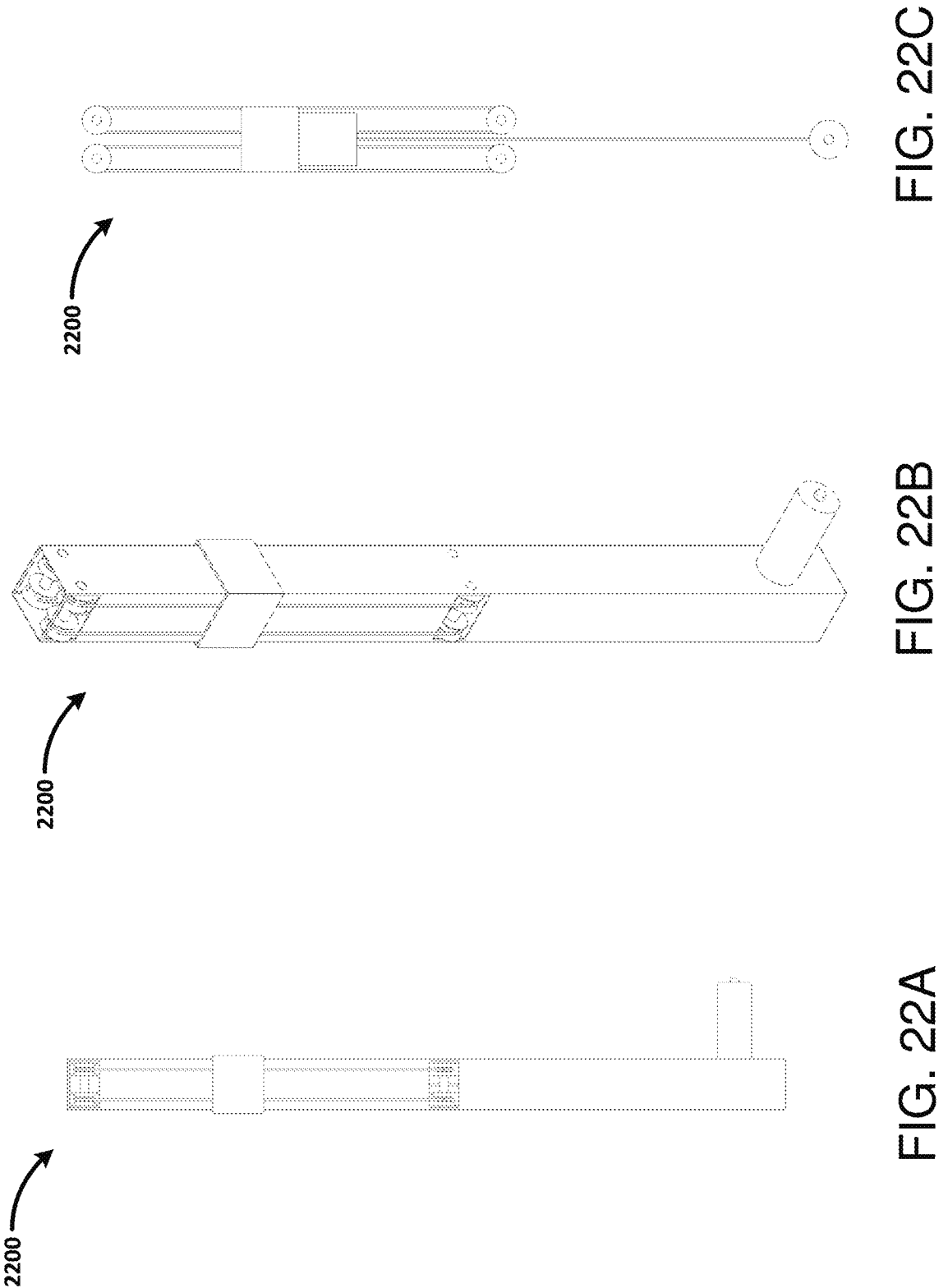
FIG. 22A, FIG. 22B, and FIG. 22C depict various views of exemplary counterbalance pulleys.
Figure 23:
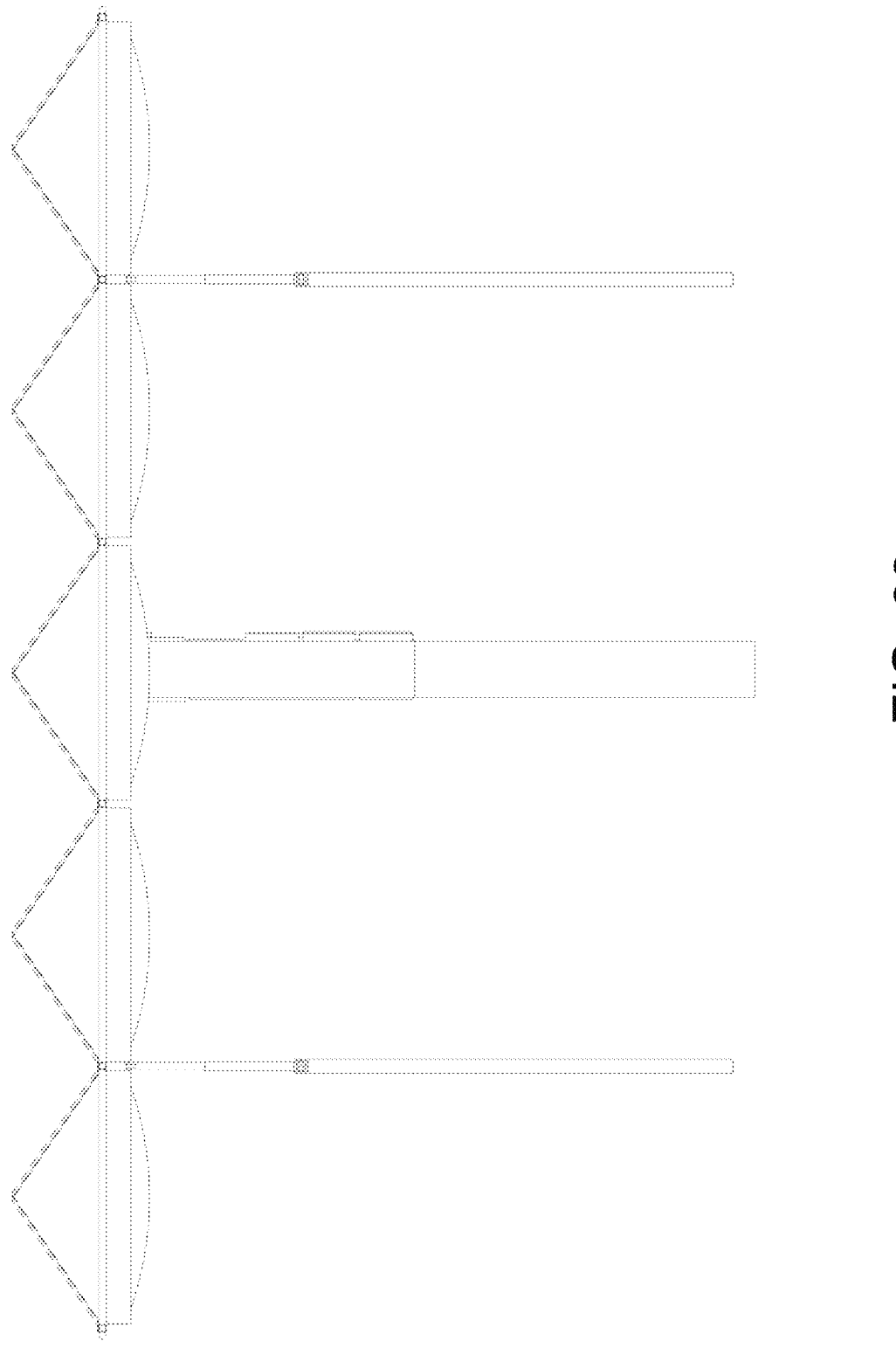
FIG. 23 depicts a side view of an exemplary sun tracking mechanism.

FIG. 22A, FIG. 22B, and FIG. 22C depict various views of an exemplary counterbalance pulley 2200. For example, the exemplary counterbalance pulley 2200 may be used to counterbalance the reflective panels 2005. FIG. 23 depicts a side view of an exemplary sun tracking mechanism (e.g., using the exemplary counterbalance pulley 2200).

Figure 24:
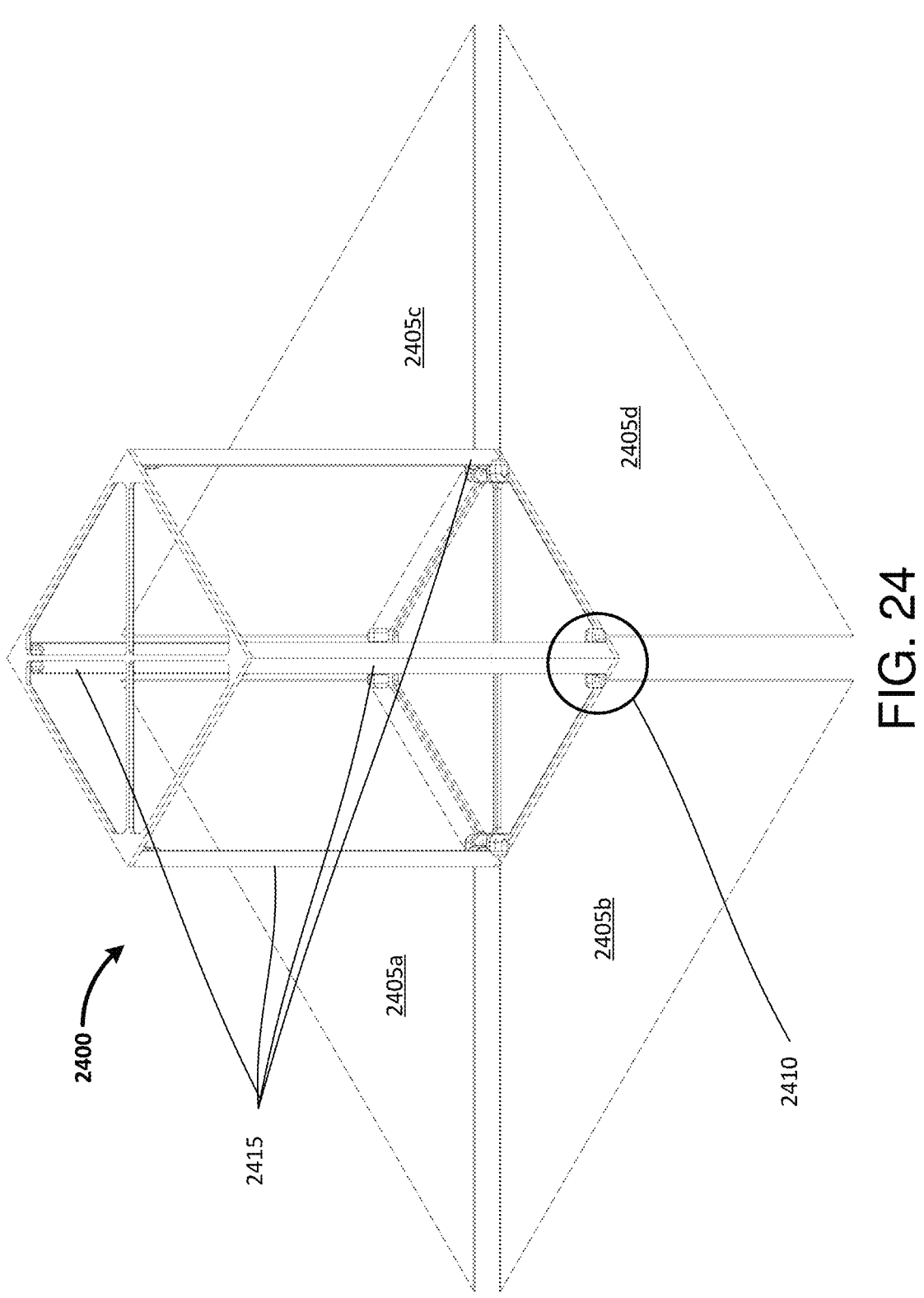
FIG. 24 depicts an exemplary flexible concentrating element for a cube satellite with a deployed flexible concentrator.

FIG. 24 depicts an exemplary flexible concentrating element for a cube satellite with a deployed flexible concentrator. As shown, a deployable flexible concentrator element 2400 may include 4 trapezoidal segments 2405*a*, 2405*b*, 2405*c*, 2405*d*. For example, each of the segments 2405*a-d* may be attached to a pair of spring loaded spars 2410. For example, the spring loaded spars 2410 may be tucked into faces of a satellite for launch. For example, the spring loaded spars 2410 may be configured to unfold upon deployment. For example, reflective surfaces may include thin Mylar, Kapton, and/or other sufficiently strong and lightweight film, coated in appropriate reflective coatings. For example, arms 2415 may also double as antennas for communications.

Figure 25:
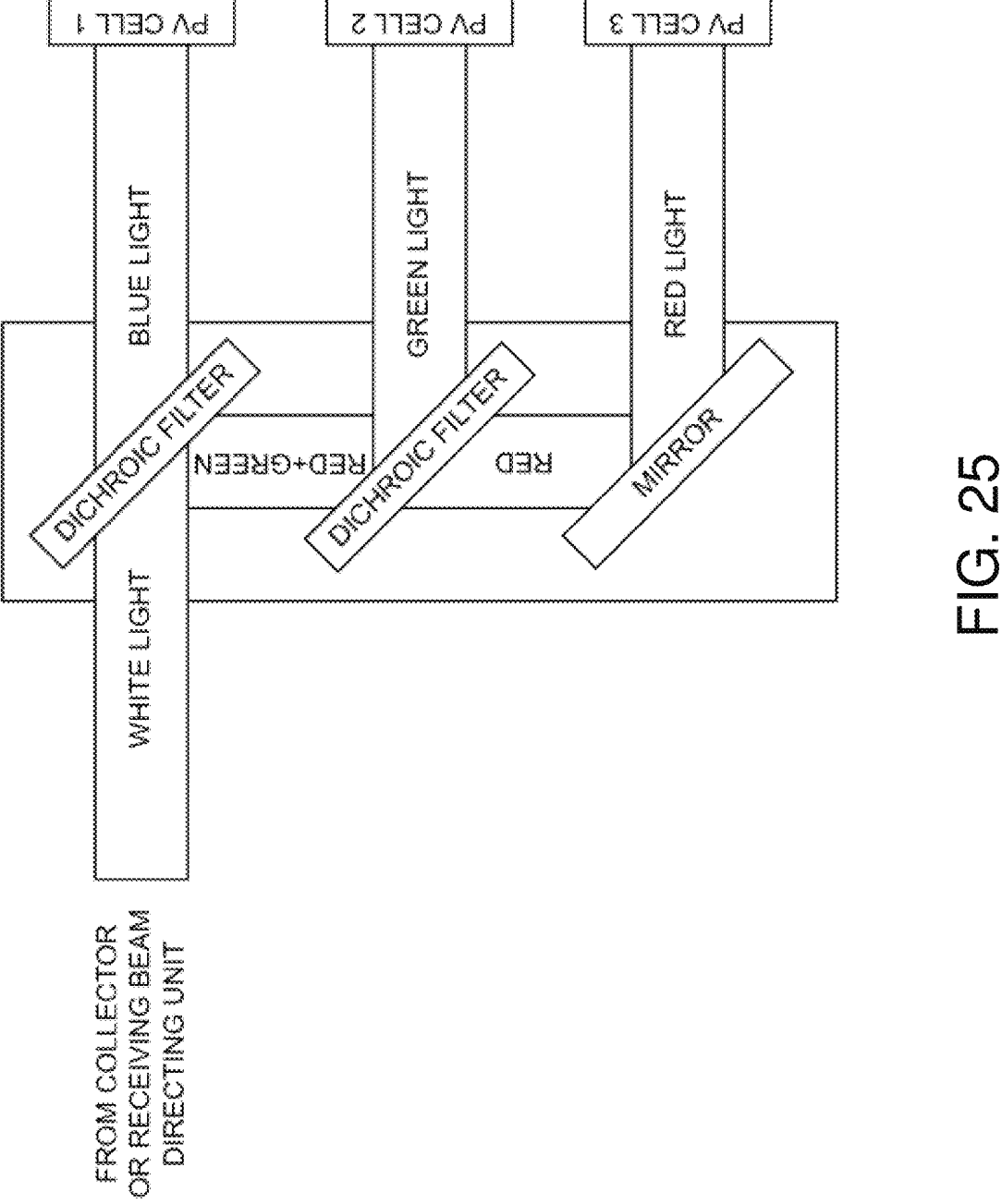
FIG. 25 depicts an exemplary tower light filtration process.

FIG. 25 depicts an exemplary tower light filtration process.

Figure 26:
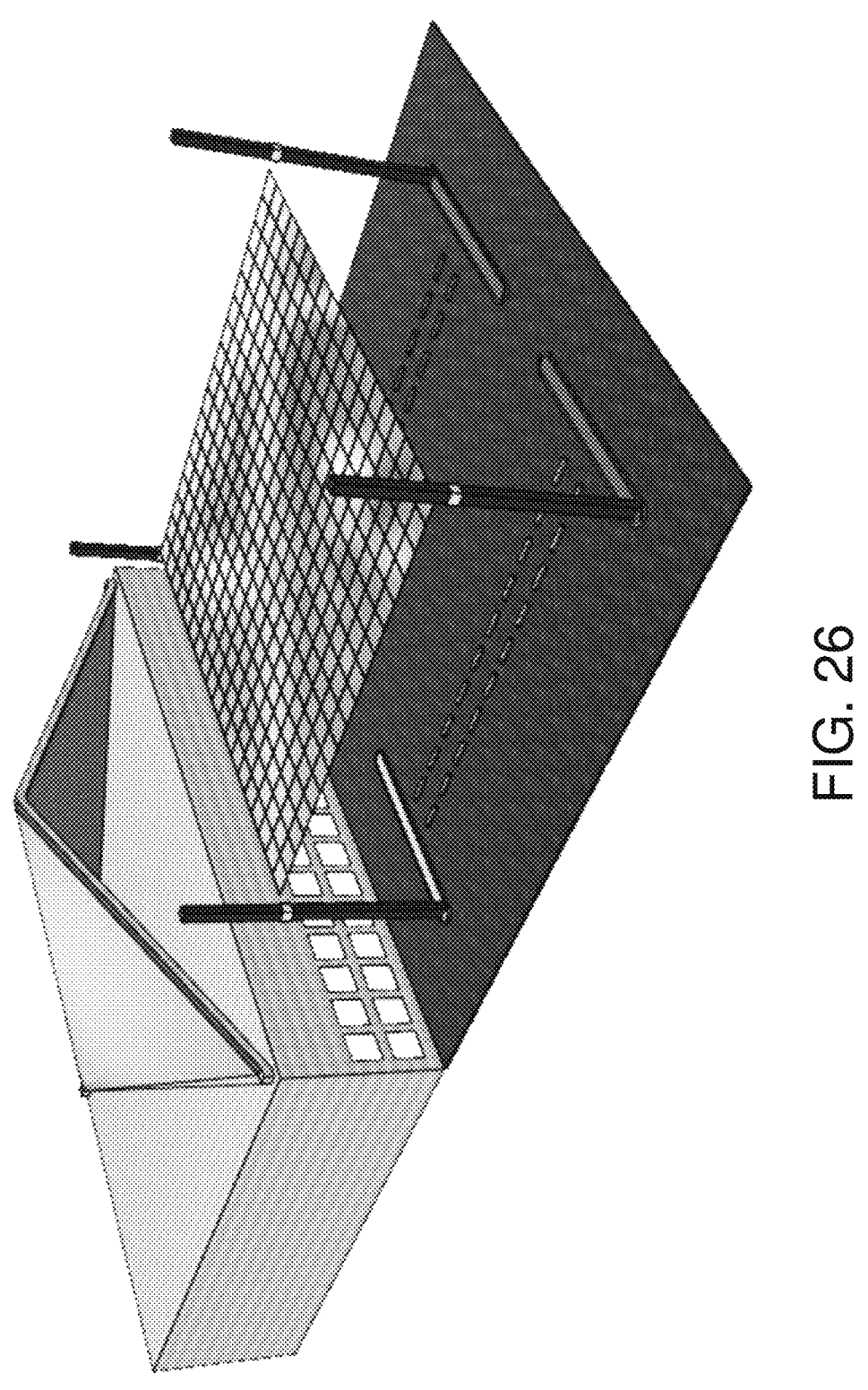
FIG. 26 depicts an exemplary grocery store, with a large array overhead and a parabolic concentrator, controlled by four large control columns.

FIG. 26 depicts an exemplary grocery store, with a large array overhead and a parabolic concentrator, controlled by four large control columns.

Figure 27:
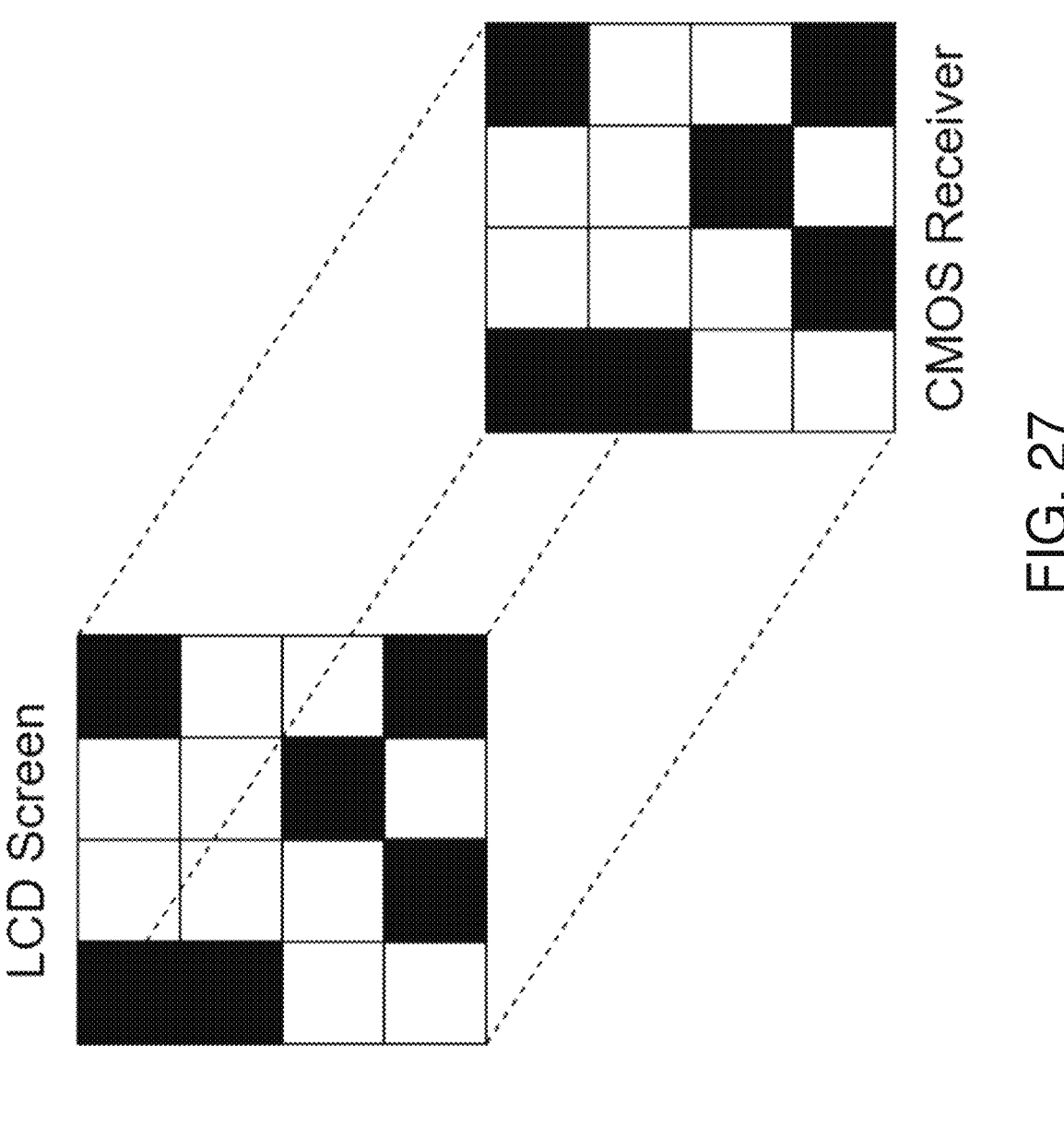
FIG. 27 depict an exemplary beam data transmission system including a complementary metal-oxide semiconductor (CMOS) receiver.

FIG. 27 depict an exemplary beam data transmission system including a complementary metal-oxide semiconductor (CMOS) receiver. In this example, the beam data transmission system may encode 16 bits per "packet" via a collimated beam and an LCD screen. The "QR Code" may be transmitted through a steerable beam transceiver unit (e.g., the BTU 700) to a recipient CMOS.

Figure 28:
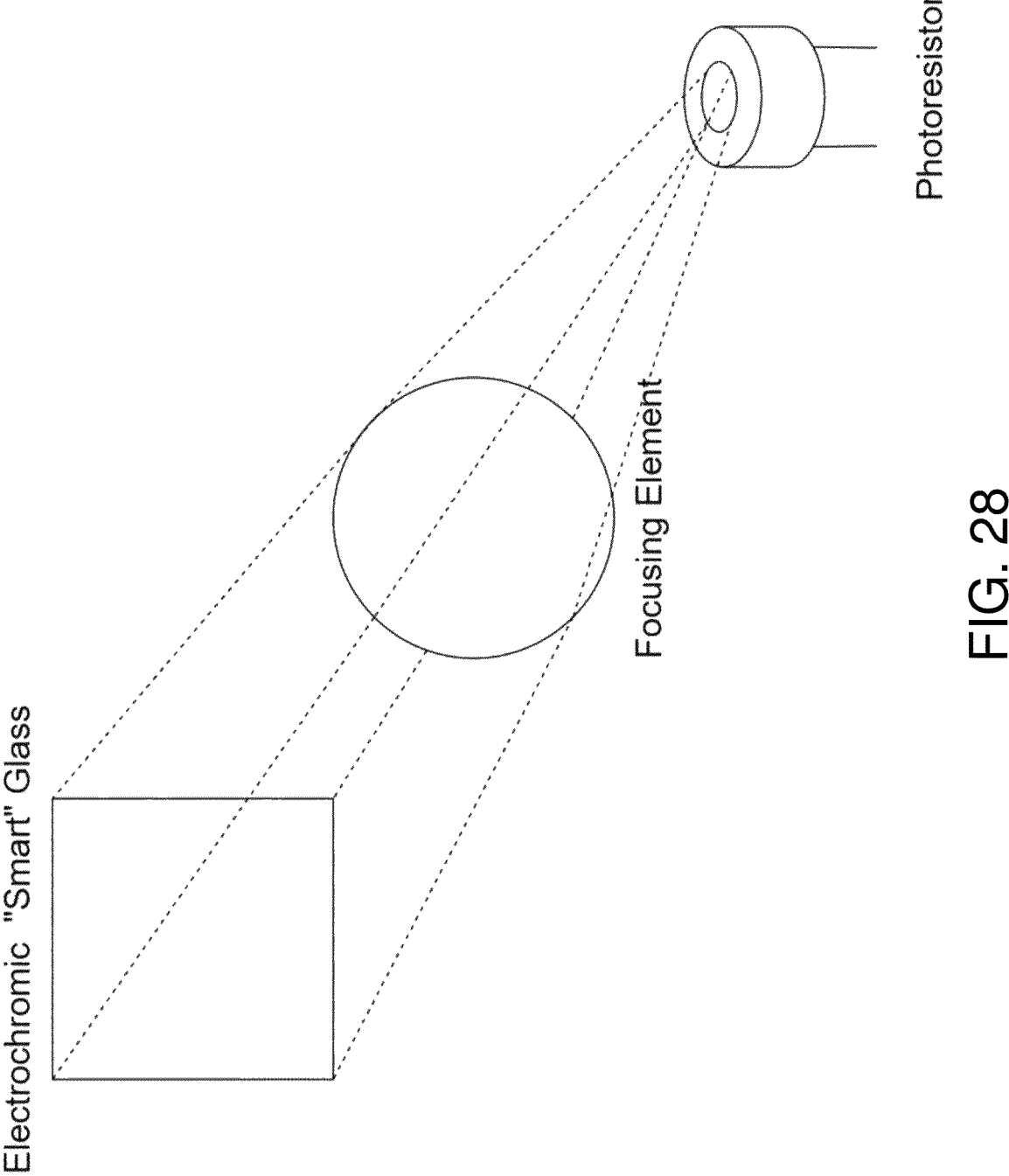
FIG. 28 depict an exemplary beam data transmission system including a photoresistor and a smart glass.

FIG. 28 depict an exemplary beam data transmission system including a photoresistor and a smart glass. For example, for longer distances, a beam may be too distorted or blurred. For example, data may be transmitted in 1-bit packets. For example, for lower bandwidth and/or longer distance transfer, the CW CMOS 530 and/or the CCW CMOS 535 (FIG. 5) may be replaced by a simple photodiode (e.g., a photoresistor). In some examples, the transparent LCD 630*a*, the transparent LCD 630*b*, and/or the transparent LCD 630*c* (FIG. 6) may be replaced by a smart glass. For example, the smart glass may be turned on and off in order to encode data.

Although various embodiments have been described with reference to the figures, other embodiments are possible.

In some implementations, the PETACS 125 may include safety features. For example, the PETACS 125 may include optical detectors to detect beam interference nearby. For example, the optical detectors may include infrared sensors or other optical light curtains for detecting a proximity of an object to a transmitting beam. For example, when an object (e.g., a person, birds) is detected near the transmitting beam, the PETACS 125 may temporarily divert the transmitting beam into a ceramic trap, and/or divert the beam to another target so that the beam is dynamically assigned to a different route.

Some embodiments may utilize the dual wave-particle nature of electromagnetic energy, specifically in between the near infrared to ultraviolet bands. For example, the photonic energy network 100 may include modular photonic devices to provide high speed communication, and supply the adequate thermal, electrical, general lighting, and other types of energy needs for multiple different industries.

Various embodiments may include devices which collect photons either from solar or stellar sources, or receive photons from other devices, then collimate them either onto a thermal, electrical, mechanical, or chemical energy conversion, disperse them to provide general lighting, or redirect concentrated beams to devices in its the line of site. Multiple devices may receive multiple beams, and either divide, add, or simply relay the beam, allowing communication and power supply around or over obstacles.

In some implementations, the MSC 300 and/or the PETACS 125 may be scalable as required. For example, the PETACS 125 may be utilized by stationary facilities. For example, the PETACS 125 may be used to power moving vehicles. As an illustrative example, in a moving vehicle, the MSC 300 may be omitted in favor of larger receiver units, which track nearby concentrating devices, and connect to them wirelessly for light and data.

In a way, this network combines the advantages of optical fiber, overhead electrical power lines, and wireless radio frequency transmission. As with optical fiber, it is capable of handling extremely high bandwidth digital information, and similar to electrical power lines, it is capable of transmitting large amounts of power. Unlike optical fiber and electrical power lines however, it retains the redundancy and minimal infrastructure requirements of wireless radio frequency transmission.

Although an exemplary system has been described with reference to the figures, other implementations may be deployed in other industrial, scientific, medical, commercial, and/or residential applications.

In some implementations, quantum computing may be employed in the photonic energy network 100. For example, the beam multiplexer 130 may include one or more quantum computing models (Quantum gate array, One-way quantum computer, Adiabatic quantum computer, Topological quantum computer). In some implementations, the beam multiplexer 130 may use quantum computing models to enable secure and high bandwidth data transfer.

In various embodiments, some bypass circuits implementations may be controlled in response to signals from analog or digital components, which may be discrete, integrated, or a combination of each. Some embodiments may include programmed, programmable devices, or some combination thereof (e.g., PLAs, PLDs, ASICs, microcontroller, microprocessor), and may include one or more data stores (e.g., cell, register, block, page) that provide single or multi-level digital data storage capability, and which may be volatile, non-volatile, or some combination thereof. Some control functions may be implemented in hardware, software, firmware, or a combination of any of them.

Computer program products may contain a set of instructions that, when executed by a processor device, cause the processor to perform prescribed functions. These functions may be performed in conjunction with controlled devices in operable communication with the processor. Computer program products, which may include software, may be stored in a data store tangibly embedded on a storage medium, such as an electronic, magnetic, or rotating storage device, and may be fixed or removable (e.g., hard disk, floppy disk, thumb drive, CD, DVD).

Although an example of a system, which may be portable, has been described with reference to the above figures, other implementations may be deployed in other processing applications, such as desktop and networked environments.

Temporary auxiliary energy inputs may be received, for example, from chargeable or single use batteries, which may enable use in portable or remote applications. Some embodiments may operate with other DC voltage sources, such as 9V (nominal) batteries, for example. Alternating current (AC) inputs, which may be provided, for example from a 50/60 Hz power port, or from a portable electric generator, may be received via a rectifier and appropriate scaling. Provision for AC (e.g., sine wave, square wave, triangular wave) inputs may include a line frequency transformer to provide voltage step-up, voltage step-down, and/or isolation.

Although particular features of an architecture have been described, other features may be incorporated to improve performance. For example, caching (e.g., L1, L2, . . . ) techniques may be used. Random access memory may be included, for example, to provide scratch pad memory and or to load executable code or parameter information stored for use during runtime operations. Other hardware and software may be provided to perform operations, such as network or other communications using one or more protocols, wireless (e.g., infrared) communications, stored operational energy and power supplies (e.g., batteries), switching and/or linear power supply circuits, software maintenance (e.g., self-test, upgrades), and the like. One or more communication interfaces may be provided in support of data storage and related operations.

Some systems may be implemented as a computer system that can be used with various implementations. For example, various implementations may include digital circuitry, analog circuitry, computer hardware, firmware, software, or combinations thereof. Apparatus can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Various embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and CD-ROM and DVD-ROM disks. The processor and the memory can be supplemented by, or incorporated in, ASICs (application-specific integrated circuits).

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. Various embodiments may be implemented in a computer system that includes a graphical user interface and/or an Internet browser. To provide for interaction with a user, some implementations may be implemented on a computer having a display device. The display device may, for example, include an LED (light-emitting diode) display. In some implementations, a display device may, for example, include a CRT (cathode ray tube). In some implementations, a display device may include, for example, an LCD (liquid crystal display). A display device (e.g., monitor) may, for example, be used for displaying information to the user. Some implementations may, for example, include a keyboard and/or pointing device (e.g., mouse, trackpad, trackball, joystick), such as by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, the computers and networks forming the Internet, or some combination thereof. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Firewire, ATA/IDE, RS-232, RS-422, RS-485, 802.11 a/b/g, Wi-Fi, Ethernet, IrDA, FDDI (fiber distributed data interface), token-ring networks, multiplexing techniques based on frequency, time, or code division, or some combination thereof. Some implementations may optionally incorporate features such as error checking and correction (ECC) for data integrity, or security measures, such as encryption (e.g., WEP) and password protection.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

Various examples of modules may be implemented using circuitry, including various electronic hardware. By way of example and not limitation, the hardware may include transistors, resistors, capacitors, switches, integrated circuits, other modules, or some combination thereof. In various examples, the modules may include analog logic, digital logic, discrete components, traces and/or memory circuits fabricated on a silicon substrate including various integrated circuits (e.g., FPGAs, ASICs), or some combination thereof. In some embodiments, the module(s) may involve execution of preprogrammed instructions, software executed by a processor, or some combination thereof. For example, various modules may involve both hardware and software.

In an illustrative aspect, a solar power network may include a beam concentrator, a beam multiplexer operably coupled to the beam concentrator, and a plurality of energy loads of a facility conduitlessly connected to the beam multiplexer. For example, the plurality of energy loads may include a first energy load configured to consume a first form of energy, and a second energy load configured to consume a second form of energy. For example, the beam concentrator may include a tile array of reflector panels coupled to a plurality of actuators configured to track a position of a source of solar energy.

For example, the beam concentrator may receive solar energy and transmit a concentrated light beam to the beam multiplexer. For example, the beam multiplexer may include a controller, a polarizing beam splitting element, and a pulse width modulated smart glass. For example, the dichroic optical element may divide the received concentrated light beam into at least two wavelength divided solar energy beams based on predetermined ranges of wavelength For example, the at least two wavelength divided solar energy beams may be simultaneously supplied to the first energy load and the second energy load to be subsequently converted into, respectively, the first energy form and the second energy form. For example, the controller may be configured to operate the pulse width modulated smart glass to encode information onto one or more of the at least two wavelength divided solar energy beams. For example, data and energy may be simultaneously relayed between facilities when the encoded solar energy beam is transmitted to a second facility.

For example, in a solar power network of any of the preceding three paragraphs through the following three paragraphs (first paragraph set) in combination with the solar power network of any of the fourth through eighth paragraphs subsequent to this paragraph (second paragraph set), the source of solar energy may include the Sun. For example, the facility may include a space facility. For example, in a solar power network of any of the first paragraph set in combination with the solar power network of any of the second paragraph set, the plurality of energy loads may include a photonic load. For example, in a solar power network of any of t he first paragraph set in combination with the solar power network of any of the second paragraph set, the solar power network may include a photovoltaic cell assembly configured to convert one of the at least two wavelength divided solar energy beams into electrical power.

For example, in a solar power network of any of the preceding three paragraphs through the following three paragraphs (first paragraph set) in combination with the solar power network of any of the second paragraph set, photovoltaic cell assembly may include a beam collector. For example, the beam collector may include a plurality of photovoltaic cells configured to receive the at least two wavelength divided solar energy beams at a transmission angle. For example, the beam collector may include a control circuit that may include a plurality of photoresistors coupled to the plurality of photovoltaic cells. For example, the control circuit may be configured to determine a power output differential between the plurality of photovoltaic cells. For example, the beam collector actively corrects the transmission angle based on the power output differential.

The solar power network of any of the first paragraph sets in combination with the solar power network of any of the second paragraph set, for example, may include a steerable beam transceiver unit configured to receive signals from a second facility. For example, in a solar power network of any of the first paragraph set in combination with the solar power network of any of the second paragraph set, the signals may include a power request signal, such that the plurality of actuators of the beam concentrator may be operated to reflect the received solar energy to the second solar power network upon receiving the power request signal.

For example, in a solar power network of any of the first paragraph set in combination with the solar power network of any of the second paragraph set, the steerable beam transceiver may include a polarizer, a clockwise complementary metal-oxide semiconductor (CW CMOS), and a counter-clockwise CMOS (CCW CMOS). For example, the CW CMOS and the CCW CMOS may receive data signals via light through the polarizer, such that common traces for transistors to communicate with each other may be removed. For example, in a solar power network of any of the first paragraph set in combination with the solar power network of any of the second paragraph set, the steerable beam transceiver may include a photoresistor. For example, in a solar power network of any of paragraph set in combination with the solar power network of any of the second paragraph set, the steerable beam transceiver may include a photodiode.

In an illustrative aspect, a solar power network may include a beam concentrator, and a beam multiplexer operably coupled to the beam concentrator. For example, the beam concentrator may include a tile array of reflector panels coupled to a plurality of actuators configured to track a position of a source of solar energy. For example, the beam concentrator may receive solar energy and may generate a concentrated light beam. For example, the beam multiplexer may be configured to receive the concentrated light beam. For example, the beam multiplexer may include a dichroic optical element. For example, at least two wavelength divided solar energy beams may be generated based on predetermined ranges of wavelength. For example, the at least two wavelength divided solar energy beam may be simultaneously supplied to at least two conduitlessly connected energy loads to be subsequently converted into secondary forms of energy in a facility.

For example, in a solar power network of any of the second paragraph set in combination with the solar power network of any of the first paragraph set, the source of solar energy may include the Sun. For example, in a solar power network of any of the second paragraph set in combination with the solar power network of any of the first paragraph set, the facility may include a space facility. For example, the conduitlessly connected energy loads may include a photonic load.

For example, the solar power network of any of the second paragraph set in combination with the solar power network of any of the first paragraph set, may include a photovoltaic cell assembly configured to convert one of the at least two wavelength divided solar energy beams into electrical power. For example, in a solar power network of any of the second paragraph set in combination with the solar power network of any of the first paragraph set, the photovoltaic cell assembly may include a beam collector. For example, the beam collector may include a plurality of photovoltaic cells configured to receive the at least two wavelength divided solar energy beams at a transmission angle. For example, the beam collector may include a control circuit that may include a plurality of photoresistors coupled to the plurality of photovoltaic cells. For example, the control circuit may be configured to determine a power output differential between the plurality of photovoltaic cells. For example, the beam collector actively corrects the transmission angle based on the power output differential.

The solar power network, for example, of any of the second paragraph set in combination with the solar power network of any of the first paragraph set, may include a beam transceiver unit configured to receive signals from a second facility. For example, the signals may include a power request signal. For example, the plurality of actuators of the beam concentrator may be operated to reflect the received solar energy to the second solar power network upon receiving the power request signal.

For example, in a solar power network of any of the second paragraph set in combination with the solar power network of any of the first paragraph set, the beam transceiver may include a polarizer, a clockwise complementary metal-oxide semiconductor (CW CMOS), and a counter-clockwise CMOS (CCW CMOS). For example, the CW CMOS and the CCW CMOS may receive data signals via light through the polarizer. For example, common traces for transistors to communicate with each other may be removed. For example, in a solar power network of any of the second set in combination with the solar power network of any of the first paragraph set, the beam multiplexer further may include a controller and a pulse width modulated smart glass coupled to the controller. For example, the controller may be configured to regulate an amount of light received from the beam concentrator using the pulse width modulated smart glass. For example, in a solar power network of any of the second paragrtaph set in combination with the solar power network of any of the paragraph set, the controller may be configured to encode information onto one or more of the at least two wavelength divided solar energy beams. For example, the beam concentrator may be configured to receive the encoded solar energy beam to be transmitted to a third solar power network in a third facility. For example, data and energy may be simultaneously relayed between facilities.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A solar power network comprising:
a beam concentrator;
a beam multiplexer operably coupled to the beam concentrator; and,
a plurality of energy loads of a facility conduitlessly connected to the beam multiplexer, wherein the plurality of energy loads comprise a first energy load configured to consume a first form of energy, and a second energy load configured to consume a second form of energy, wherein:
the beam concentrator comprises a tile array of reflector panels coupled to a plurality of actuator configured to track a position of a source of solar energy, such that the beam concentrator receives solar energy and transmits a concentrated light beam, to the beam multiplexer and wherein:
the beam multiplexer comprises a controller, a polarizing beam splitting element, and a pulse width modulated smart glass, wherein the polarizing beam splitting element divides the received concentrated light beam into at least two wavelength divided solar energy beams based on predetermined ranges of wavelength, such that the at least two wavelength divided solar energy beams are simultaneously supplied to the first energy load and the second energy load to be subsequently converted into, respectively, the first energy form and the second energy form, and,
the controller is configured to operate the pulse width modulated smart glass to encode information onto one or more of the at least two wavelength divided solar energy beams,
wherein data and energy are simultaneously relayed between facilities when the encoded solar energy beam is transmitted to a second facility.

2. The solar power network of claim 1, wherein the source of solar energy comprises the Sun.

3. The solar power network of claim 1, wherein at least one of the facilities comprises a space facility.

4. The solar power network of claim 1, wherein the plurality of energy loads comprises a photonic load.

5. The solar power network of claim 1, further comprising a photovoltaic cell assembly configured to convert one of the at least two wavelength divided solar energy beams into electrical power.

6. The solar power network of claim 5, wherein the photovoltaic cell assembly comprises a beam collector, wherein the beam collector comprises:
a plurality of photovoltaic cells configured to receive the at least two wavelength divided solar energy beams at a transmission angle; and,
a control circuit comprising a plurality of photoresistors coupled to the plurality of photovoltaic cells, wherein the control circuit is configured to determine a power output differential between the plurality of photovoltaic cells, such that the beam collector actively corrects the transmission angle based on the power output differential.

7. The solar power network of claim 1, further comprises a steerable beam transceiver unit configured to receive signals from a facility other than the second facility, wherein the signals comprise a power request signal, wherein the plurality of actuators of the beam concentrator is operated to reflect the received solar energy to a second solar power network upon receiving the power request signal.

8. The solar power network of claim 7, wherein the steerable beam transceiver comprises a polarizer, a clockwise complementary metal-oxide semiconductor (CW CMOS), and a counter-clockwise CMOS (CCW CMOS), wherein the CW CMOS and the CCW CMOS are configured to receive data signals via light through the polarizer.

9. The solar power network of claim 7, wherein the steerable beam transceiver comprises a photoresistor.

10. The solar power network of claim 7, wherein the steerable beam transceiver comprises a photodiode.

11. A solar power network comprising:
a beam concentrator;
a beam multiplexer operably coupled to the beam concentrator, wherein:

the beam concentrator comprises a tile array of reflector panels coupled to a plurality of actuators configured to track a position of a source of solar energy, such that the beam concentrator receives solar energy and generates a concentrated light beam, and, the beam multiplexer is configured to receive the concentrated light beam, wherein the beam multiplexer comprises an optical element, configured such that at least two wavelength divided solar energy beams are generated from the concentrated light beam based on predetermined ranges of wavelength, such that the at least two wavelength divided solar energy beams are simultaneously supplied to at least two conduitlessly connected energy loads to be subsequently converted into secondary forms of energy in a facility; and a photovoltaic cell assembly configured to convert one of the at least two wavelength divided solar energy beams into electrical power, wherein the photovoltaic cell assembly comprises a beam collector, wherein the beam collector comprises:

a plurality of photovoltaic cells configured to receive the at least two wavelength divided solar energy beams at a transmission angle; and, a control circuit comprising a plurality of photoresistors coupled to the plurality of photovoltaic cells, wherein the control circuit is configured to determine a power output differential between the plurality of photovoltaic cells, such that the beam collector actively corrects the transmission angle based on the power output differential.

12. The solar power network of claim 11, wherein the beam multiplexer further comprises a controller and a pulse width modulated smart glass coupled to the controller, wherein the controller is configured to regulate an amount of light received from the beam concentrator using the pulse width modulated smart glass.

13. The solar power network of claim 11, further comprising a beam transceiver unit configured to receive signals from a second facility, wherein the signals comprise a power request signal, wherein the plurality of actuators of the beam concentrator is operated to reflect the received solar energy to a second solar power network upon receiving the power request signal.

14. A solar power network comprising:

a beam concentrator;

a beam multiplexer operably coupled to the beam concentrator, wherein:

the beam concentrator comprises a tile array of reflector panels coupled to a plurality of actuators configured to track a position of a source of solar energy, such that the beam concentrator receives solar energy and generates a concentrated light beam, and, the beam multiplexer is configured to receive the concentrated light beam, wherein the beam multiplexer comprises an optical element configured such that at least two wavelength divided solar energy beams are generated from the concentrated light beam based on predetermined ranges of wavelength, such that the at least two wavelength divided solar energy beams are simultaneously supplied to at least two conduitlessly connected energy loads to be subsequently converted into secondary forms of energy in a facility; and a beam transceiver unit configured to receive signals from a second facility, wherein the signals comprise a power request signal, wherein the plurality of actuators of the beam concentrator is operated to reflect the received solar energy to a second solar power network upon receiving the power request signal.

15. The solar power network of claim 14, wherein the source of solar energy comprises the Sun.

16. The solar power network of claim 14, wherein the facility comprises a space facility.

17. The solar power network of claim 14, wherein the conduitlessly connected energy loads comprise a photonic load.

18. The solar power network of claim 14, wherein the beam transceiver comprises a polarizer, a clockwise complementary metal-oxide semiconductor (CW CMOS), and a counter-clockwise CMOS (CCW CMOS), wherein the CW CMOS and the CCW CMOS are configured to receive data signals via light through the polarizer.

19. The solar power network of claim 14, wherein the beam multiplexer further comprises a controller and a pulse width modulated smart glass coupled to the controller, wherein the controller is configured to regulate an amount of light received from the beam concentrator using the pulse width modulated smart glass.

20. The solar power network of claim 19, wherein the controller is configured to encode information onto one or more of the at least two wavelength divided solar energy beams, wherein:

the beam concentrator is configured to receive the encoded solar energy beam to be transmitted to a third solar power network in a third facility, wherein data and energy are simultaneously relayed between facilities.

* * * * *